(12) United States Patent  (10) Patent No.: US 6,542,212 B2
Yoshida et al.  (45) Date of Patent: Apr. 1, 2003

(54) LIQUID CRYSTAL DISPLAY APPARATUS WITH COMB-SHAPED ELECTRODES

(75) Inventors: Hidefumi Yoshida, Kawasaki (JP); Yohei Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/797,564

(22) Filed: Mar. 2, 2001

(65) Prior Publication Data
US 2001/0010575 A1 Aug. 2, 2001

Related U.S. Application Data

(62) Division of application No. 09/282,574, filed on Mar. 31, 2001, now Pat. No. 6,222,599.

(30) Foreign Application Priority Data

Dec. 28, 1998 (JP) .......................... 10-374731
Jun. 23, 1998 (JP) .......................... 10-175978

(51) Int. Cl.⁷ .................................. G02F 1/1343
(52) U.S. Cl. ..................... 349/141; 349/38; 349/143
(58) Field of Search ........................ 349/130, 141, 349/143, 144, 39, 38, 106

(56) References Cited

U.S. PATENT DOCUMENTS 5,084,778 A    1/1992  DeJule et al. ............... 350/336
5,598,285 A    1/1997  Kondo et al. ................. 349/39
5,641,974 A *  6/1997  den Boer et al. ............. 257/59
5,666,179 A *  9/1997  Koma ........................ 349/143
5,926,244 A    7/1999  Takeda et al. .............. 349/139
5,969,781 A   10/1999  Matsuyama et al. ........ 349/130
6,005,650 A   12/1999  Kim et al. .................. 349/130
6,028,653 A    2/2000  Nishida ..................... 349/141
6,034,757 A    3/2000  Yanagawa et al. .......... 349/141
6,040,886 A    3/2000  Ota et al. .................. 349/141
6,091,473 A *  7/2000  Hebiguchi .................. 349/141
6,218,770 B1 * 4/2001  Ando et al. ................. 310/354
6,292,245 B1 * 9/2001  Lee et al. .................. 349/139

FOREIGN PATENT DOCUMENTS

JP    60-230117 A  * 11/1985
JP    10-048652     2/1998
JP    10-153782     6/1998

* cited by examiner

Primary Examiner—William L. Sikes
Assistant Examiner—Tarifur R. Chowdhury
(74) Attorney, Agent, or Firm—Greer, Burns & Crain, Ltd.

(57) ABSTRACT

A liquid crystal display apparatus includes a vertically aligned liquid crystal layer sealed between the first and second substrates. A first group of electrodes are formed on the first substrate, and a second group of electrodes are formed on the second substrate at staggered positions with respect to the first electrodes, the electrodes extending in the form of linearly elongated strips in a direction parallel to the substrate surfaces. A liquid crystal display apparatus of a transverse electric field drive type is thus provided.

12 Claims, 24 Drawing Sheets

LIQUID CRYSTAL DISPLAY APPARATUS WITH COMB-SHAPED ELECTRODES

This is a divisional, of application Ser. No. 09/282,574, field Mar. 31, 2001 now U.S. Pat. No. 6,222,599

BACKGROUND OF THE INVENTION

1. Field of the Invention

The present invention relates to a liquid crystal display apparatus and, in particular, to a liquid crystal display apparatus for turning on and off the liquid crystal molecules by forming an electric field in the direction substantially parallel to the substrate surfaces in order to realize a liquid crystal display apparatus having a superior visual angle characteristic.

2. Description of the Related Art

A liquid crystal display apparatus for turning on and off the liquid crystal molecules by forming an electric field in the direction substantially parallel to the substrate surfaces is also called a transverse electric field drive type liquid crystal display apparatus. In the transverse electric field drive type liquid crystal display apparatus, one of a pair of the substrates holding the liquid crystal has a first electrode and a second electrode, and the electric field is formed from the first electrode toward the second electrode. Such a liquid crystal display apparatus is described in JP-A-7-36058, for example.

The horizontal electric field drive type liquid crystal display apparatus uses a liquid crystal of a horizontal alignment type. The liquid crystal is first aligned in a first direction parallel to the substrate surfaces, and upon application of a voltage thereto, comes to be aligned parallel to the substrate surfaces in a second direction rotated from the first direction. Specifically, upon application of a voltage thereto, the liquid crystal molecules try to be arranged in parallel to the electric field formed between the first and second electrodes. The motion of the liquid crystal molecules occurs in a plane parallel to the substrate surfaces, and therefore the visual angle characteristic is not deteriorated unlike in the TN type liquid crystal, thereby realizing a liquid crystal display apparatus having a wide visual angle characteristic.

JP-A-7-159807 discloses a modification of a transverse electric field drive type liquid crystal display apparatus. In this liquid crystal display apparatus, one of a pair of substrates holding the liquid crystal has a first electrode, and the other substrate has a second electrode. The first and second electrodes are at positions staggered from each other in a direction parallel to the substrate surfaces. In this case, the first and second electrodes extend in narrow strips parallel to each other. The plane containing the first and second electrodes is diagonal to the substrate surfaces to thereby form an oblique electric field. The distance between the first and second electrodes, however, is very large compared with the thickness of the liquid crystal layer, and therefore the plane containing the first and second electrodes can be considered substantially parallel to the substrate surfaces. In this case, too, therefore, a horizontal alignment type of liquid crystal is used, which behaves in the same manner as in the aforementioned case.

JP-A-10-48671 discloses a liquid crystal display apparatus driven by an oblique electric field. A pixel electrode and a common electrode are both formed in the shape of comb. Each of the pixel electrode and the common electrode includes a plurality of linear electrode elements parallel to each other.

In the transverse electric field drive type liquid crystal display apparatus with first and second electrodes formed on one substrate, the electric field is formed from the first electrode toward the second electrode. The strength of the electric field is higher near the substrate having the electrodes and weaker near the substrate having no electrodes. Upon application of a voltage, therefore, the liquid crystal is not uniformly aligned between the first and second substrates, and a disclination may occur within a pixel. Also, in the case where only one of the substrates has electrodes while the other substrate has no electrode, static electricity may stay in the alignment layer of the substrate having no electrode.

In the transverse electric field drive type liquid crystal display apparatus with the first substrate having the first electrode and the second substrate having the second electrode, on the other hand, the problem of static electricity is solved. Actually, however, the electric field is formed obliquely to the substrate surfaces from the first electrode toward the second substrate. As a result, when a voltage is applied, the liquid crystal of horizontal alignment type tilts up obliquely while rotating to set in a position parallel to the electric field. It is difficult for the liquid crystal of horizontal alignment type, however, to tilt up obliquely while rotating. The liquid crystal behavior may thus be disturbed.

Further, the transverse electric field drive type liquid crystal display apparatus is so configured that at least one of the first and second electrodes is formed in a pixel, thereby often leading to a small aperture ratio. In view of this, the electrodes are required to be arranged in a manner capable of realizing bright display with a large aperture ratio.

In an oblique electric field system for driving a liquid crystal by applying different voltages to the electrodes on two substrates making up a liquid crystal panel, once the two substrates are misaligned from each other, the gap between the electrode on one substrate and the electrode on the other substrate changes, thereby posing the problem that the voltage-transmittance characteristic undergoes a change. The accuracy with which the two substrates are attached to each other, therefore, is very strict and a very small manufacturing margin is allowed.

SUMMARY OF THE INVENTION

An object of the present invention is to provide a liquid crystal display apparatus of transverse electric field drive type in which the behavior of the liquid crystal can be accurately controlled.

A liquid crystal display apparatus, according to the present invention, comprises first and second opposed substrates, a liquid crystal layer sealed between the first and second substrates, first electrodes formed on the first substrate, and second electrodes formed on the second substrate at positions shifted from the first electrodes in a direction parallel to the substrate surfaces, the liquid crystal of the liquid crystal layer being vertically aligned and the dielectric anisotropy of the liquid crystal being positive.

With this configuration, the first electrode is formed on the first substrate, the second electrode is formed on the second substrate, and the first and second electrodes are arranged at positions shifted from each other in the direction parallel to the substrate surfaces. Therefore, when a voltage is applied between the first electrode and the second electrode, an oblique electric field is formed between the first electrode and the second electrode. The liquid crystal molecules are aligned vertically, and the liquid crystal has a positive dielectric anisotropy. As a consequence, the obliqueness of the electric field causes the liquid crystal molecules to be inclined in the direction parallel to the oblique electric field. As a result, an alignment free of disclination is realized with a voltage applied. The absence of disclination eliminates the portion where elastic energy stays and realizes a lower threshold voltage.

Preferably, the liquid crystal comprises a blended liquid crystal containing at least one of a fluorinated liquid crystal and a cyanic liquid crystal.

The first and second electrodes extend linearly and are elongated at least partially. The first and second electrodes are at least partially parallel to each other.

One of the first and second substrates has a black matrix and a color filter. The electrode of the substrate having the black matrix and the color filter constitute a portion of the black matrix. The black matrix is formed in contact with the substrate. The color filter has a slit formed at the position of the electrode formed by the black matrix.

One of the first and second electrodes is a solid electrode, and the color filter is formed on the transparent solid electrode. The color filter has a slit, and the portion of the solid electrode exposed from the slit constitutes one of the first and second electrodes.

A third electrode is formed on one of the first and second electrodes in such a manner as to share a potential with one of the first and second electrodes.

The third electrode is formed in such a manner as to be overlapped at least partially with one of the first and second electrodes.

One of the first and second substrates has a gate line and a data line, and the electrode formed on the other of the first and second substrates is formed in such a manner as to cover the data line. One of the first and second electrodes is displaced in the direction toward the pixel from the data line in the same plane and covers the data line.

One of the first and second substrates has a gate line and a data line. One of the first and second electrodes is formed in proximity to one of the gate line and the data line.

One of the first and second substrates has a gate line and a data line. The electrode formed in the other of the first and second substrates is formed in a pixel.

One of the first and second substrates has a gate line, a data line and a TFT. One of the first and second electrodes is connected to the source electrode of the TFT and extends onto the next gate line thereby to form an subsidiary capacitor.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1A:
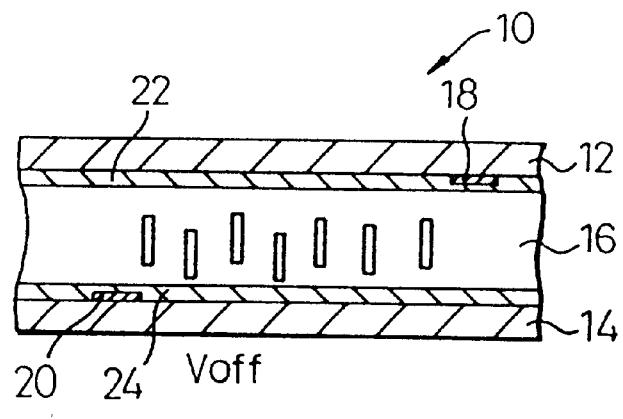
FIGS. 1A to 1C are views illustrating the principle and a basic configuration of the present invention.
Figure 1B:
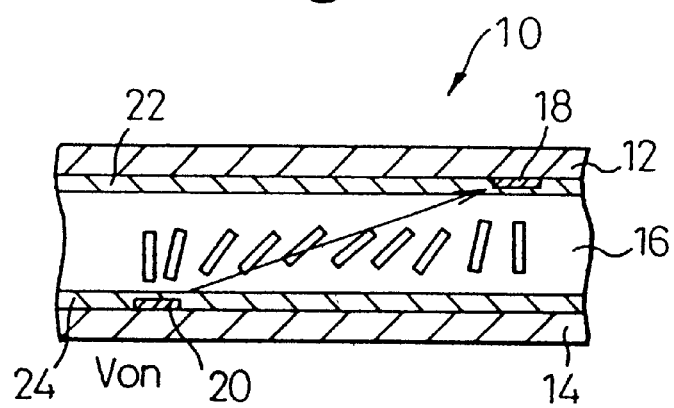
Figure 1C:
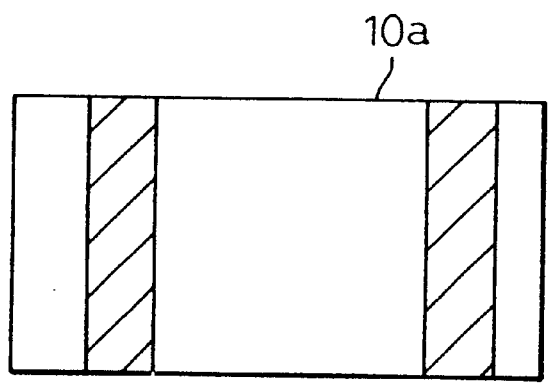

FIGS. 1A to 1C show the principle and a basic configuration of the present invention. FIG. 1A shows a liquid crystal display apparatus when no voltage is applied thereto, FIG. 1B shows a liquid crystal display apparatus when a voltage is applied thereto, and FIG. 1C shows the display of a pixel when a voltage is applied thereto.

In FIGS. 1A to 1C, the liquid crystal display apparatus 10 comprises first and second opposed transparent glass substrates 12 and 14, and a liquid crystal layer 16 sealed between the first and second substrates 12 and 14.

A first electrode 18 is formed on the first substrate 12, and a second electrode 20 is formed on the second substrate 14. Note that FIGS. 1A to 1C show a substantially one pixel region, and that a plurality of first electrodes 18 and a plurality of second electrodes 20 are provided in the liquid crystal display apparatus. The first electrode 18 and the second electrode 20 extend in the form of linearly elongated strips in the direction perpendicular to the sheet of FIGS. 1A to 1C. The second electrode 20 is not overlapped (or opposed) with the first electrode 18 and shifted from the latter in the direction parallel to the substrate surface. According to the embodiment, the first electrode 18 is a common electrode, and the second electrode 20 is a pixel electrode.

The liquid crystal of the liquid crystal layer 16 is vertically aligned. The dielectric anisotropy of the liquid crystal is positive. Further, alignment layers 22 and 24 are formed on the first and second substrates 12 and 14, respectively. The alignment layers 22 and 24 are of the vertical alignment type. The vertical alignment layers 22 and 24 can be polyimide vertical alignment layers made by Japan Synthetic Rubber. The liquid crystal can be one having a positive dielectric anisotropy made by Merck & Co. The liquid crystal is a blended liquid crystal containing at least one of a fluorinated liquid crystal and a cyanic liquid crystal.

Thus, as shown in FIG. 1A, when no voltage is applied thereto, the liquid crystal molecules are aligned substantially perpendicular to the substrate surfaces. As shown in FIG. 1B, when a voltage is applied between the first electrode 18 and the second electrode 20, as indicated by arrow, an electric field directed from the second electrode 20 toward the first electrode 18 is formed.

Although the electric field is formed at an angle to the substrate surfaces, the distance between the first electrode 18 and the second electrode 20 is considerably larger than the thickness of the liquid crystal layer 16. Therefore, the inclination of the plane containing the first electrode 18 and the second electrode 20 is comparatively small and the plane can be considered substantially parallel to the substrate surfaces. The liquid crystal display apparatus 10 can thus be considered as a type of a horizontal electric field drive type liquid crystal display apparatus. The electric field formed at an angle to the substrate surfaces is hereinafter called an oblique electric field.

When a voltage is applied, the liquid crystal molecules vertically aligned and having a positive dielectric anisotropy are aligned parallel to the oblique electric field. Many liquid crystal molecules in each pixel transfer very smoothly from the state of FIG. 1A to the state of FIG. 1B and are aligned stably in parallel to the oblique electric field. Consequently, as shown in FIG. 1C, the unit pixel area 10i aof the liquid crystal display apparatus 10 can realize a bright display free of disclination.

Figure 2A:
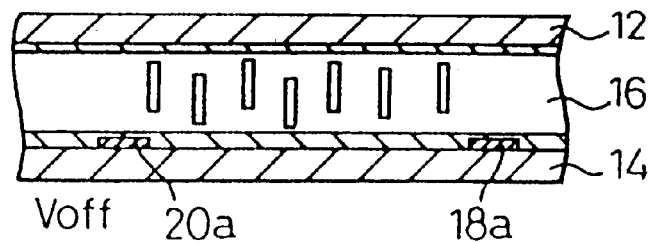
FIGS. 2A to 2C are views illustrating an example for comparison with the liquid crystal display apparatus of FIG. 1.
Figure 2B:
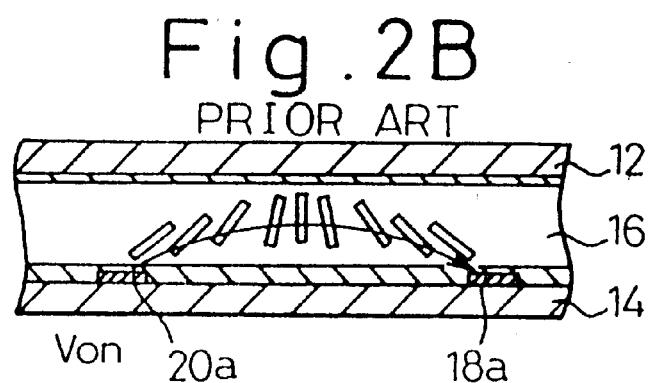
Figure 2C:
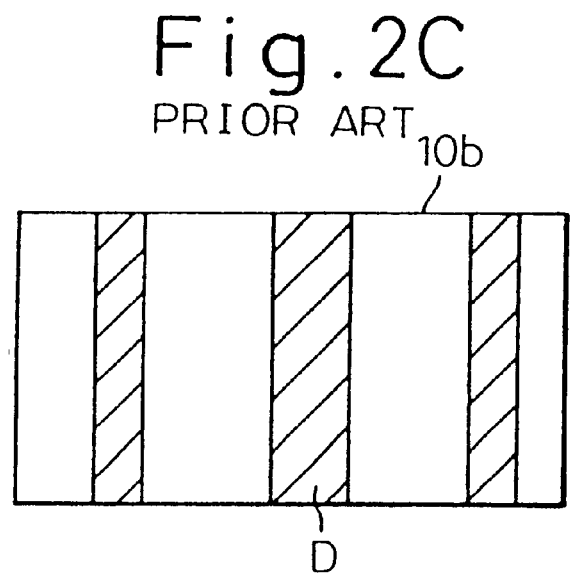

FIGS. 2A to 2C show an example for comparison with the liquid crystal display apparatus of FIGS. 1A to 1C. In FIGS. 2A to 2C, a first electrode 18a and a second electrode 20a are formed only on the second substrate 14. The liquid crystal layer 16 includes liquid crystal vertically aligned and having a positive dielectric anisotropy. Therefore, when a voltage is applied, as indicated by an arrow, the liquid crystal molecules are aligned parallel to the horizontal electric field. It is uncertain, however, whether the liquid crystal molecules located in the intermediate portion between the two electrodes 18a and 20a follow the direction of alignment of the liquid crystal molecules on the extreme right side or the direction of alignment of the liquid crystal molecules on the extreme left side, resulting in an unstable alignment of the liquid crystal. Thus, as shown in FIG. 2C, a disclination D occurs at the central portion of the unit pixel area 10b of the liquid crystal display apparatus.

Also, in the configuration of FIGS. 1A to 1C, in the case where the liquid crystal molecules have a negative dielectric anisotropy, the liquid crystal molecules are aligned perpendicular to the electric field. This is analogous to the alignment of the liquid crystal molecules located in the intermediate portion of FIG. 2B. In this case, the liquid crystal molecules are substantially vertically aligned and therefore cannot realize a bright display. In the embodiment of FIGS. 1A to 1C, an alignment free of disclination is realized when a voltage is applied thereto. The absence of the disclination eliminates the portion where elastic energy. stays and the threshold voltage can be reduced.

Figure 3A:
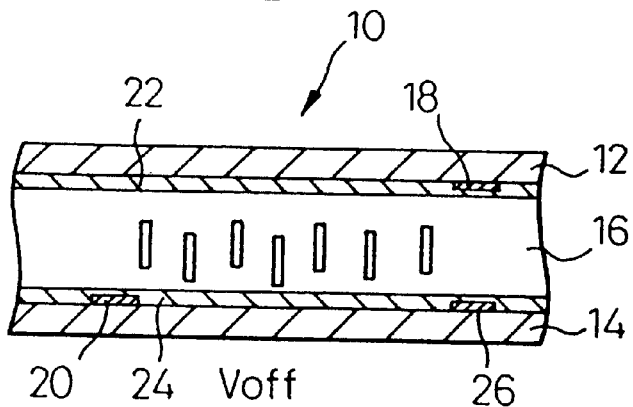
FIGS. 3A to 3C are views showing a modification of the configuration- of FIGS. 1A to 1C.
Figure 3B:
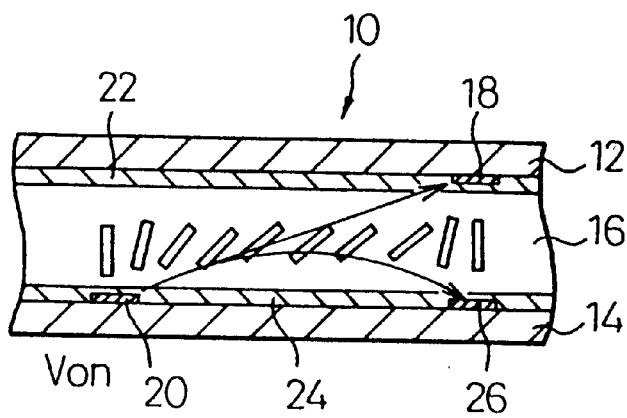
Figure 3C:
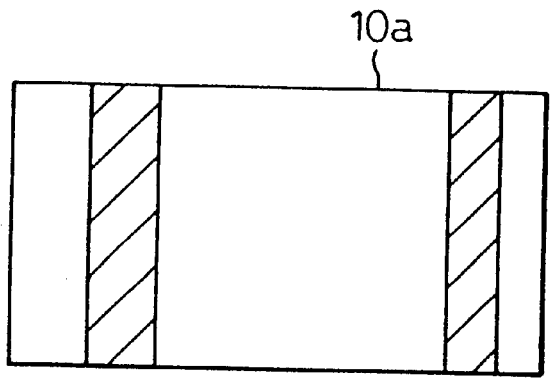

FIGS. 3A to 3C show a modification of the configuration of FIGS. 1A to 1C. FIG. 3A shows a liquid crystal display apparatus with no voltage applied thereto, FIG. 3B shows a liquid crystal display apparatus with a voltage applied thereto, and FIG. 3C shows the display of a unit pixel with a voltage applied thereto. In FIGS. 3A to 3C, the liquid crystal display apparatus 10 comprises first and second opposed transparent glass substrates 12 and 14, and a liquid crystal layer 16 sealed between the first and second substrates 12 and 14.

A first electrode 18 is formed on the first substrate 12, and a second electrode 20 and a third electrode 26 are formed on a second substrate 14. The first electrode 18, the second electrode 20 and the third electrode 26 extend in the form of linearly elongated strips in the direction perpendicular to the sheet of FIGS. 3A to 3C. The second electrode 20 is not overlapped with the first electrode 18, and is disposed at a position different from the first electrode 18 in the direction parallel to the substrate surface. The third electrode 26 is disposed at a position overlapped with (or opposed to) the first electrode 18. In FIGS. 3A to 3C, the first electrode 18 and the third electrode 26 are common electrodes, and the second electrode 20 is a pixel electrode. The liquid crystal of the liquid crystal layer 16 is vertically aligned and has a positive dielectric anisotropy. Further, vertical alignment layers 22 and 24 are formed on the first and second substrates 12 and 14, respectively.

As a result, as shown in FIG. 3A, when no voltage is applied thereto, the liquid crystal molecules are aligned substantially perpendicular to the substrate surfaces. As shown in FIG. 3B, when a voltage is applied between the first electrode 18 and the second electrode 20 and between the third electrode 26 and the second electrode 20, as indicated by arrows, electric fields directed from the second electrode 20 toward the first electrode 18 and the third electrode 26 are formed.

As described above, the combined use of an oblique electric field and a transverse electric field stabilizes especially the alignment of the liquid crystal molecules located in the intermediate portion. As shown in FIG. 3C, therefore, the pixel area 10a of the liquid crystal display apparatus 10 can realize a bright display free of disclination. Also, the drive voltage can be reduced.

Figure 4:
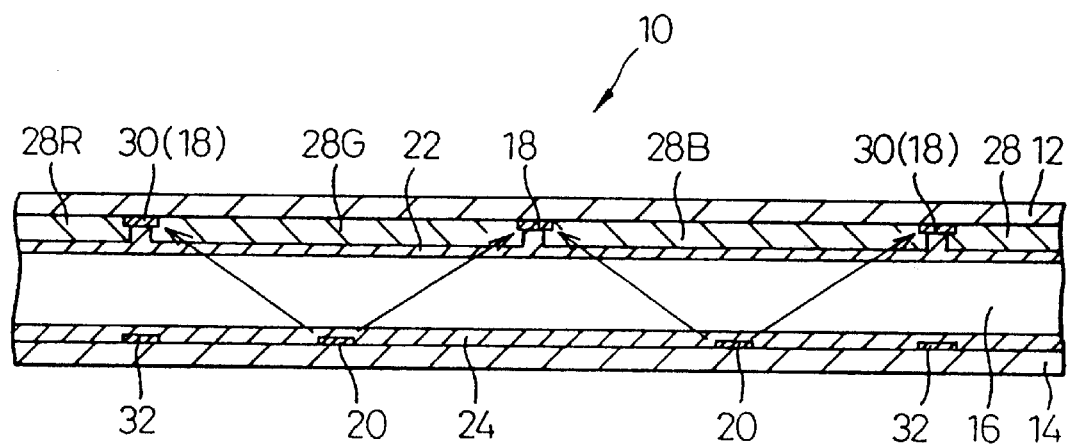
FIG. 4 is a cross-sectional view showing an embodiment with a detailed configuration of FIGS. 1A

FIG. 4 is a cross-sectional view showing the configuration of FIGS. 1A and 1B in more detail according to the embodiment. The first substrate 12 is a color filter substrate including a color filter 28 and a black matrix 30. The color filter 28 includes a red pixel 28R, a green pixel 28G and a blue pixel 28B. The first group of electrodes 18 are configured of portions of the black matrix 30 extending linearly in the direction perpendicular to the page.

The black matrix 30 is formed of a metal such as chromium in contact with the first substrate 12. The color filter 28 is formed on the black matrix 30. In order to facilitate application of a voltage to the liquid crystal, the color filter 28 is formed with slits at the portions of the black matrix 30 corresponding to the first electrodes 18, so that the color filter layer is not present on the first electrodes 18. The portions where the alignment layer 22.appears to protrude upward are the slits in the color filter 28.

The second substrate 14 is TFT substrate formed with TFTs (not shown). The TFT substrate has TFTs formed at the intersections of gate lines (scanning lines) and data lines extending in grid. Each TFT includes a gate electrode connected to the gate line, a drain electrode connected to the data line, and a source electrode. Each second electrode 20 is formed of an extension with the source electrode. The data lines 32 are also shown in FIG. 4. The data lines 32 are located under the first electrodes 18, respectively, and each second electrode 20 is located intermediately between two first electrodes 18. In this way, the first electrodes 18 constitute a common electrode and the second electrodes 20 constitute pixel electrodes.

Figure 5:
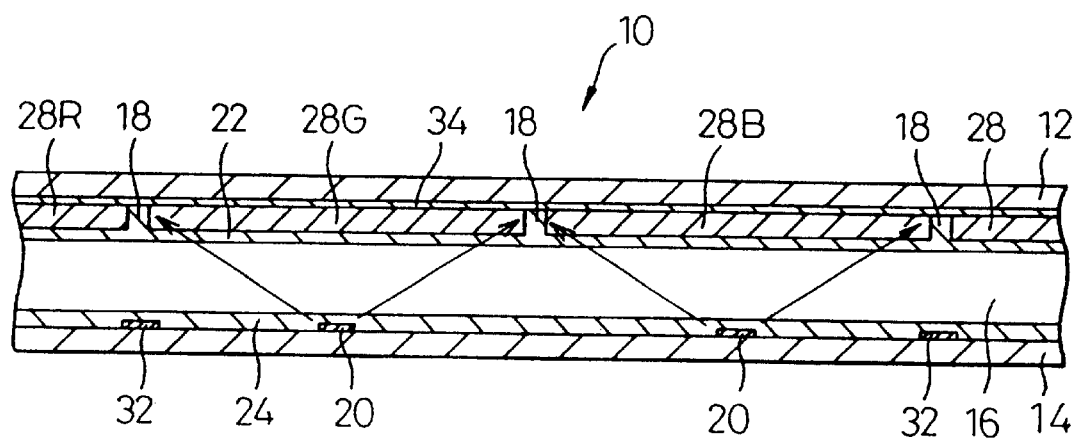
FIG. 5 is a cross-sectional view showing a modification of the embodiment of FIG. 4.

FIG. 5 shows a modification of the embodiment of FIG. 4. In this example, a solid ITO electrode 34 is formed over the first substrate 12 constituting a color filter substrate. The color filter 28 is formed on the solid ITO electrode 34. Like in the example of FIG. 4, the color filter 28 is formed with slits from which the ITO portions which form the first electrodes 18 are exposed. The color filter 28 has a comparatively large thickness of 1 to 2 $\mu$m, and therefore the portions of the solid ITO electrode 34 covered with the color filters 28 fail to contribute to driving the liquid crystal. Also, the configuration of FIGS. 4 and 5 has a sufficient function of protection against static electricity.

Figure 6:
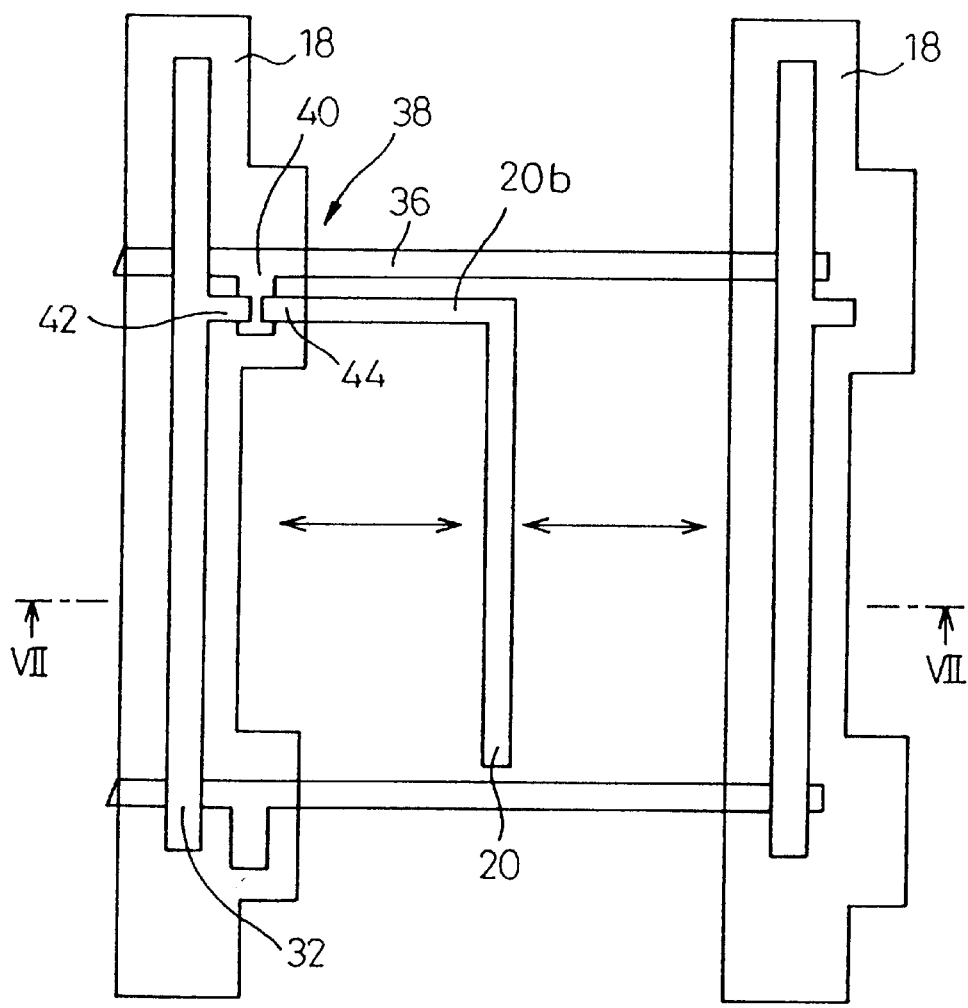
FIG. 6 is a plan view showing an application of the embodiment of FIG. 4.
Figure 7:
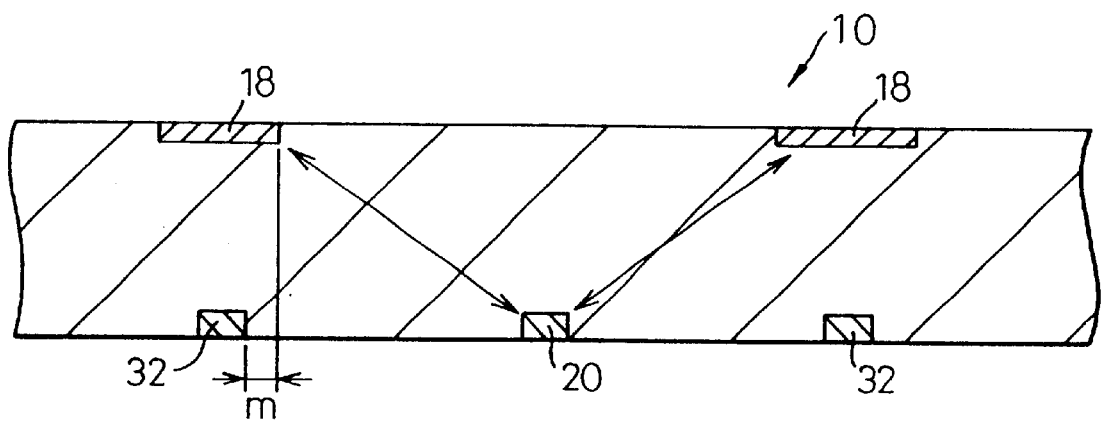
FIG. 7 is a cross-sectional view taken in line VII—VII in FIG. 6; FIG.

FIGS. 6 and 7 show.an application of the embodiment of FIG. 4. The TFT 38 is formed at the intersection between the gate line 36 and the data line 32. The TFT 38 includes the gate electrode 40, the drain electrode 42 and the source electrode 44. The second electrode 20 extends parallel to the data line 32, via a first portion 20b extending from the source electrode to the intermediate portion of the pixel in parallel to the gate line 36. 44. In this way, the second electrode 20 is arranged at the central portion of the pixel.

Each first electrode 18 which is formed by the black matrix 30, covers the TFT 38 and extends upward of the data line 32 with a larger width than the data line 32. The first electrode 18 is overlapped with the data line 32 with a margin m, and thereby protected from the effect of the electric field generated from the data line 32. In other words, the alignment of the liquid crystal is disturbed in a certain area by the electric field formed between the first electrode 18 and the data line 32. Since this area is covered by the first electrode 18, however, the display is not affected. The color filter 28 is not shown.

Figure 8:
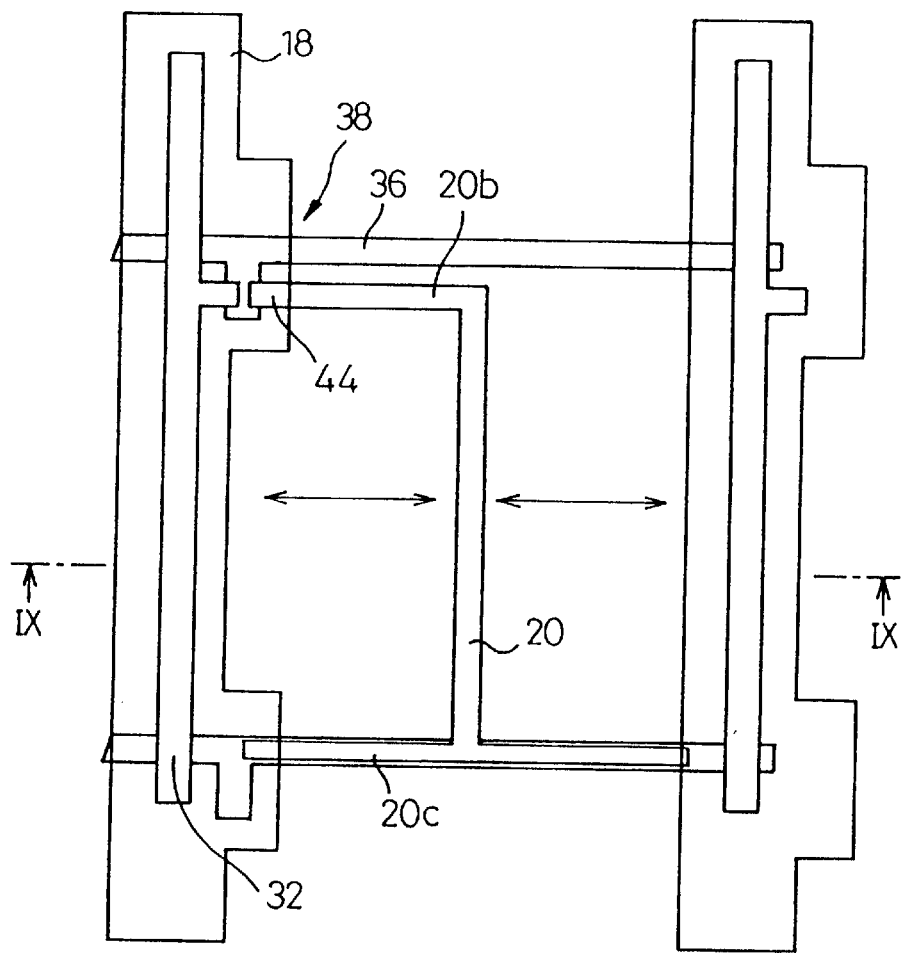
FIG. 8 is a view showing a modification of the embodiment of FIG. 6 in which subsidiary capacitors are formed.
Figure 9:
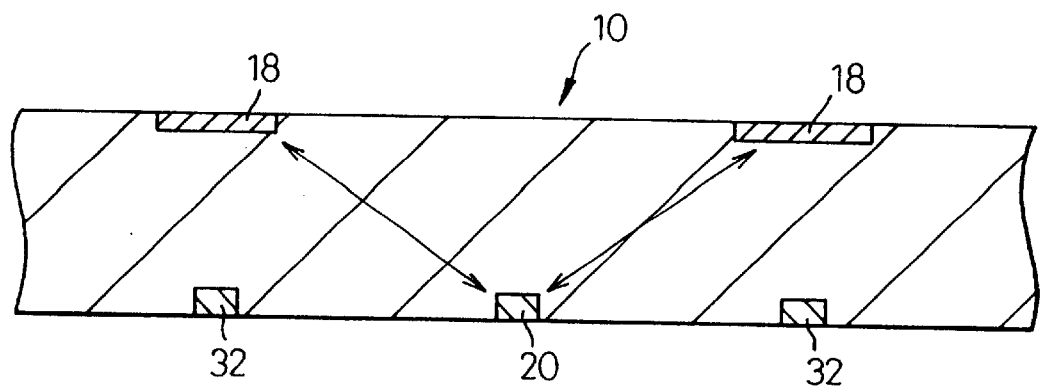
FIG. 9 is a cross-sectional view taken in line IX—IX in FIG. 8.

FIGS. 8 and 9 show a modification of the embodiment of FIGS. 6 and 7. In this example, the second electrode 20 extends parallel to the data line 32, via the first portion 20b extending from the source electrode 44, to the intermediate portion of the pixel in parallel to the gate line 36, and includes a second portion 20c extending along and overlapping the gate line 36. In this way, the second electrode 20 functions the same way as the preceding embodiment while, at the same time, forming a Cs-on-Gate structure providing a subsidiary capacitor for the liquid crystal.

Figure 10:
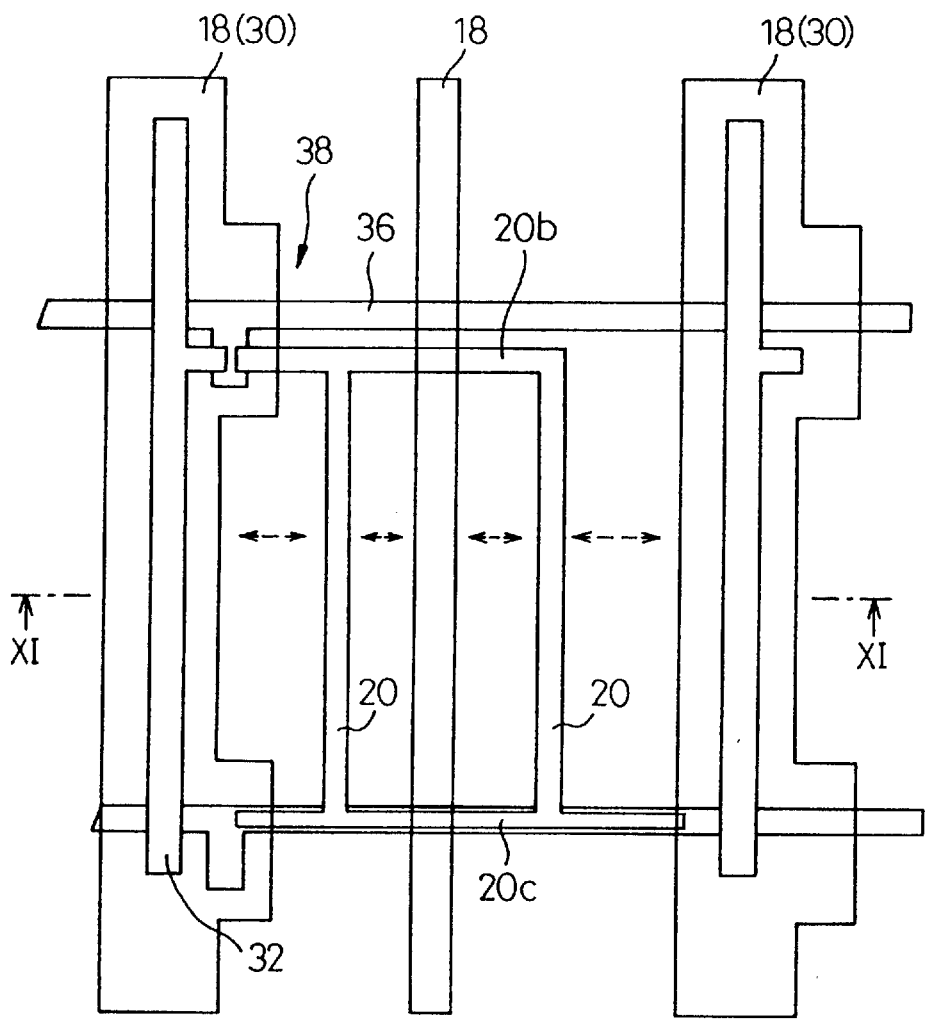
FIG. 10 is a view showing a modification of the embodiment of FIG. 8 in which the pixel is divided in a greater number.
Figure 11:
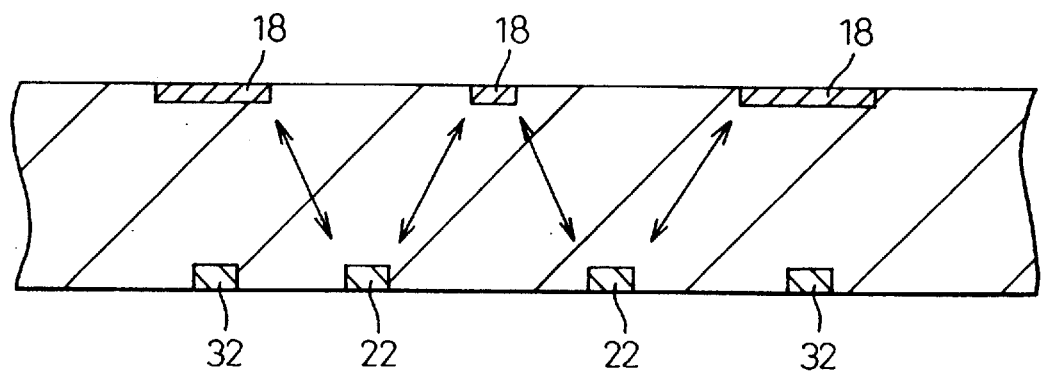
FIG. 11 is a cross-sectional view taken in line XI—XI in FIG. 10.

FIGS. 10 and 11 show a modification of the embodiment of FIGS. 8 and 9, which presents an increased number of pixel divisions. In this example, the electrode 20 extends in two portions parallel to the data line 32 from the first portion 20b, which extends from the source electrode 44 to the intermediate portion of the pixel in parallel to the gate line 36. Further, two first electrodes 18 are arranged outside of the two second electrodes 20, and another first electrode 18 is added between the two second electrodes 20. In this way, a plurality of electric fields are formed from the second electrodes 20 toward the first electrodes 18 at shorter intervals. The pixel can also be divided into four or more parts.

Figure 12:
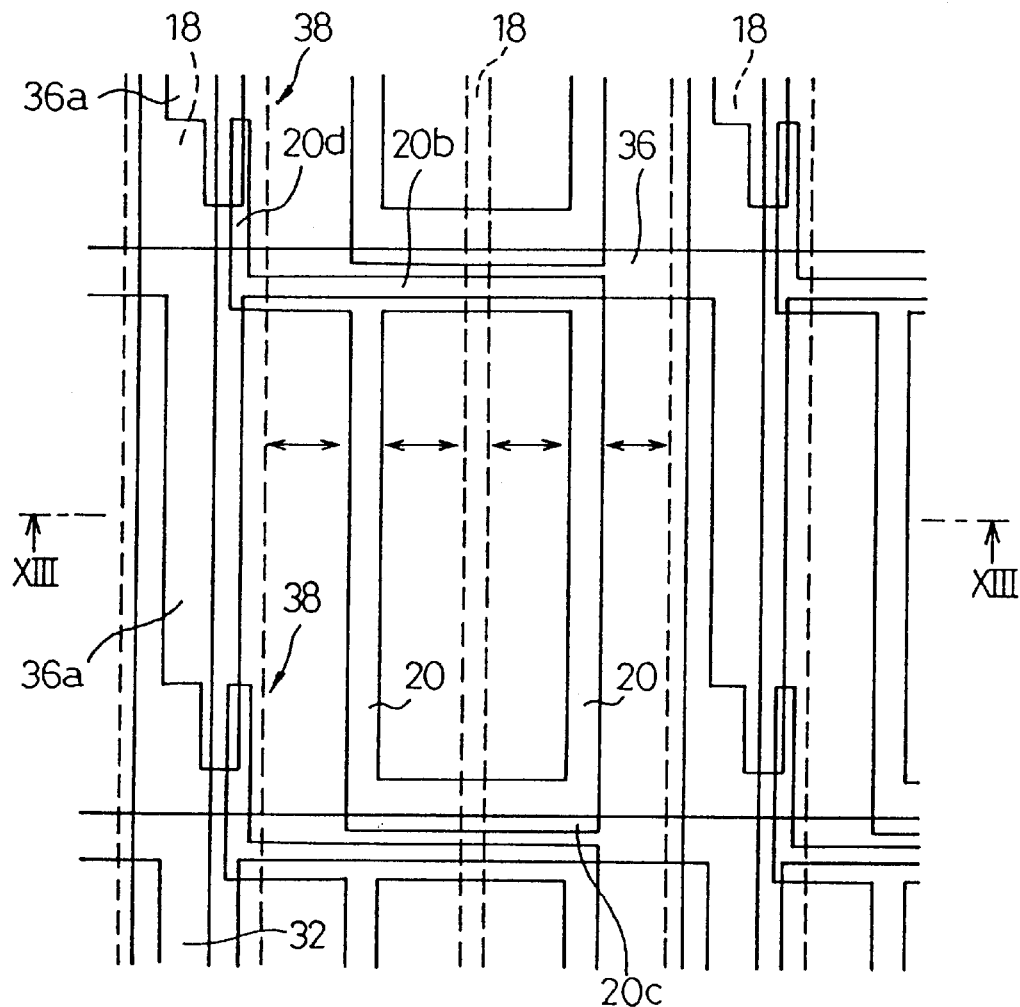
FIG. 12 is a view showing a modification of the embodiment of FIG. 10 in which TFTs are formed at the forward end of extended gate lines.
Figure 13:
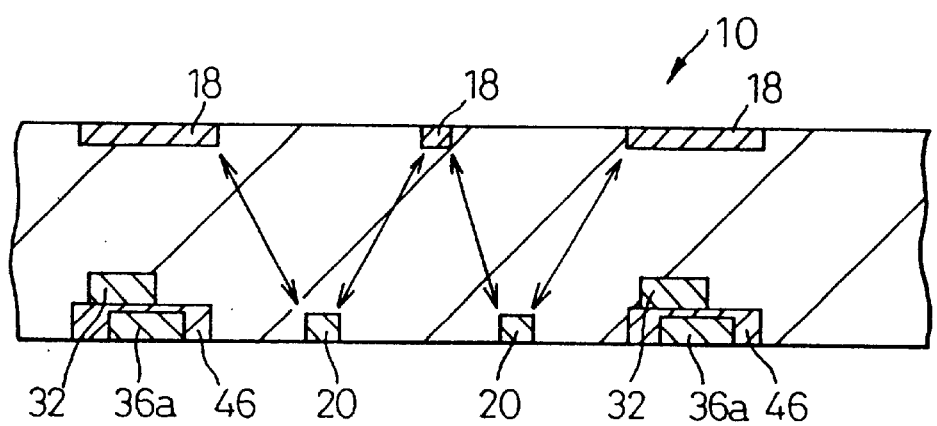
FIG. 13 is a cross-sectional view taken in line XIII—XIII in FIG. 12.

FIGS. 12 and 13 show a modification of the embodiment of FIGS. 10 and 11, in which the gate line is extended and a TFT is formed at the forward end thereof. The gate line 36 has an extension 36a extending downward in the drawing along the data line 32, which is formed above the extension 36a of the gate line 36 via an insulating layer 46. The TFT 38 is formed at the forward end of the lower extension 36a of the gate line 36.

Further, the second electrode 20 is connected to the TFT 38 disposed in the upper part of the drawing. Specifically, the second electrode 20 has a third portion 20d extending somewhat downward from the source electrode of the TFT 38, which third portion turns rightward to form the first portion 20b extending along the gate line 36, which in turn extends downward in two strips, as in the preceding case. The first portion 20b of the second electrode 20 extending along the gate line 36 overlaps the gate line 36. In the preceding case, in which the first portion 20b extends inward of the pixel as compared with the gate line 36, the aperture ratio is reduced. In this embodiment, in contrast, the aperture ratio is improved. Also, in contrast, portion 20b and the second portion 20c form a subsidiary capacitor by being overlapped on the gate line 36.

Figure 14:
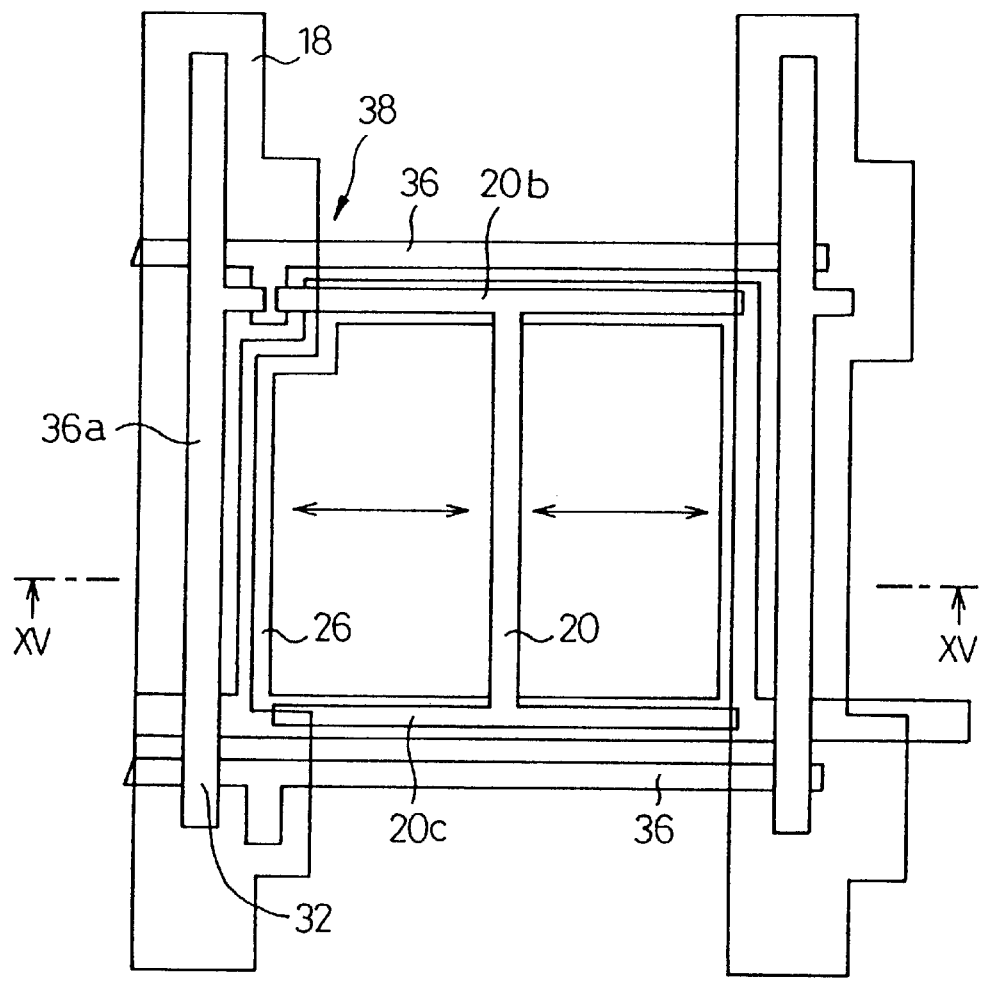
FIG. 14 is a view showing a modification of the embodiment of FIG. 6 in which an oblique electric field and a horizontal electric field are used at the same time.
Figure 15:
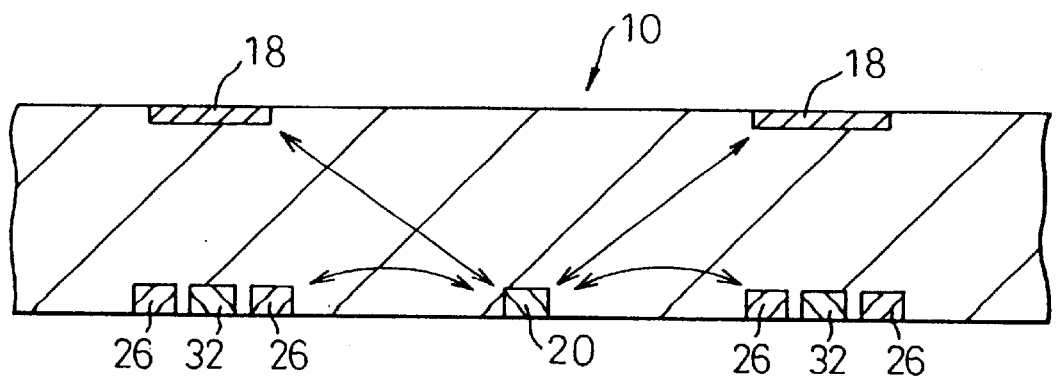
FIG. 15 is a cross-sectional view taken in line XV—XV in FIG. 14.

FIGS. 14 and 15 show a modification of the embodiment of FIGS. 6 and 7, showing an example using both the oblique electric field and the transverse electric field at the same time. The first electrode 18 and the second electrode 20 are formed in substantially a similar manner to the embodiment of FIGS. 6 and 7. The third electrode 26, similar to the one shown in FIG. 3, is formed in a rectangular frame. The third electrode 26 is formed in the same layer as the gate line 36. The third electrode 26 is set to the same potential as the first electrode 18. In this way, in the case where the second electrode 20 and the third electrode 26 are formed on the TFT substrate, the problem is that the structure is complicated and the aperture ratio is reduced. In spite of this, the electric field is shut off from the data line very effectively. Also, the first portion 20b and the second portion 20c of the second electrode 20 overlapped with the third electrode 26 forms a subsidiary capacitor. An insulating layer is of course interposed in the overlapped electrode portions.

Figure 16:
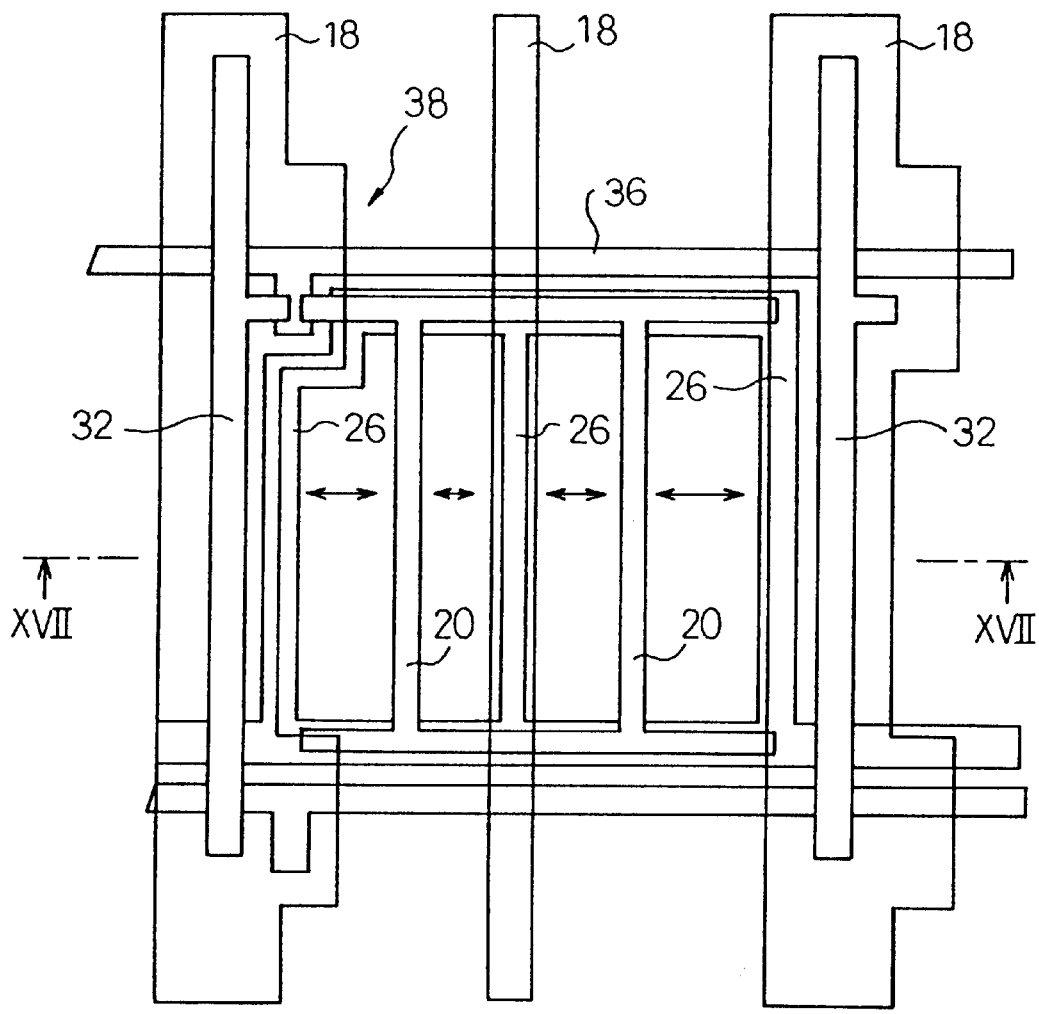
FIG. 16 is a view showing a modification of the embodiment of FIG. 14, in which a common electrode of the opposed substrate is added to the center of the pixel.
Figure 17:
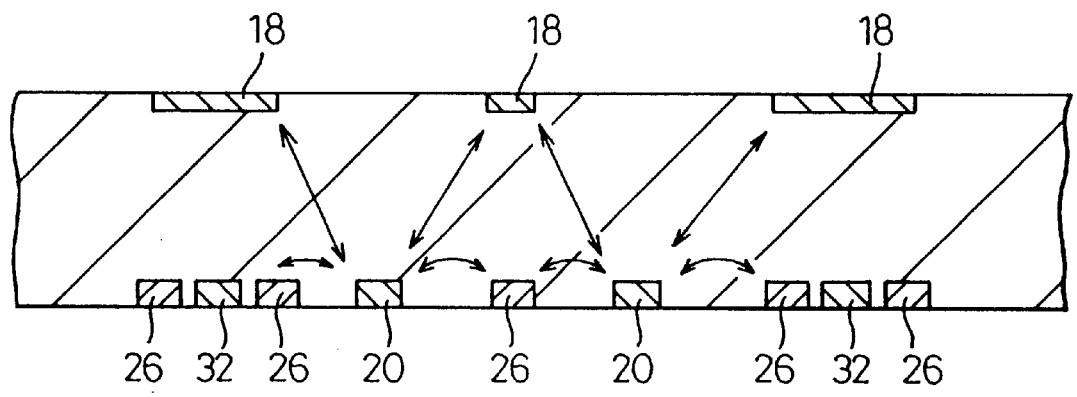
FIG. 17 is a cross-sectional view taken in line XVII—XVII in FIG. 16.

FIGS. 16 and 17 show a modification of the embodiment of FIGS. 14 and 15 in which the third electrode 26 is added to the center of the pixel. In this case, the second electrode 20 is in two strips, and the first electrode 18 and the third electrode 26 are in three strips. In this way, the pixel is divided and driven. The third electrode 26 is in the shape of a frame.

The first electrode 18 and/or the third electrode 26 constituting a common electrode are preferably formed in such a position as to surround the pixel in order to minimize the effect of the transverse electric field from the data line 32 or the gate line 36. The embodiments of FIGS. 6 to 17, for example, are designed with this fact taken into consideration.

The embodiments described above assume TFTs of an inverse stagger type, and therefore the gates exist in the lowest layer. If the top gate type is used (in which Cs is formed between the source electrode and the gate electrode), on the other hand, the gate of the Cs-on-Gate structure can be more preferably formed on the data line. In such a case, the data line 32 can be covered with the lower extension 36a of the gate line 36, and therefore the adverse effect of the horizontal electric field due to the data electrode can be prevented.

Figure 22:
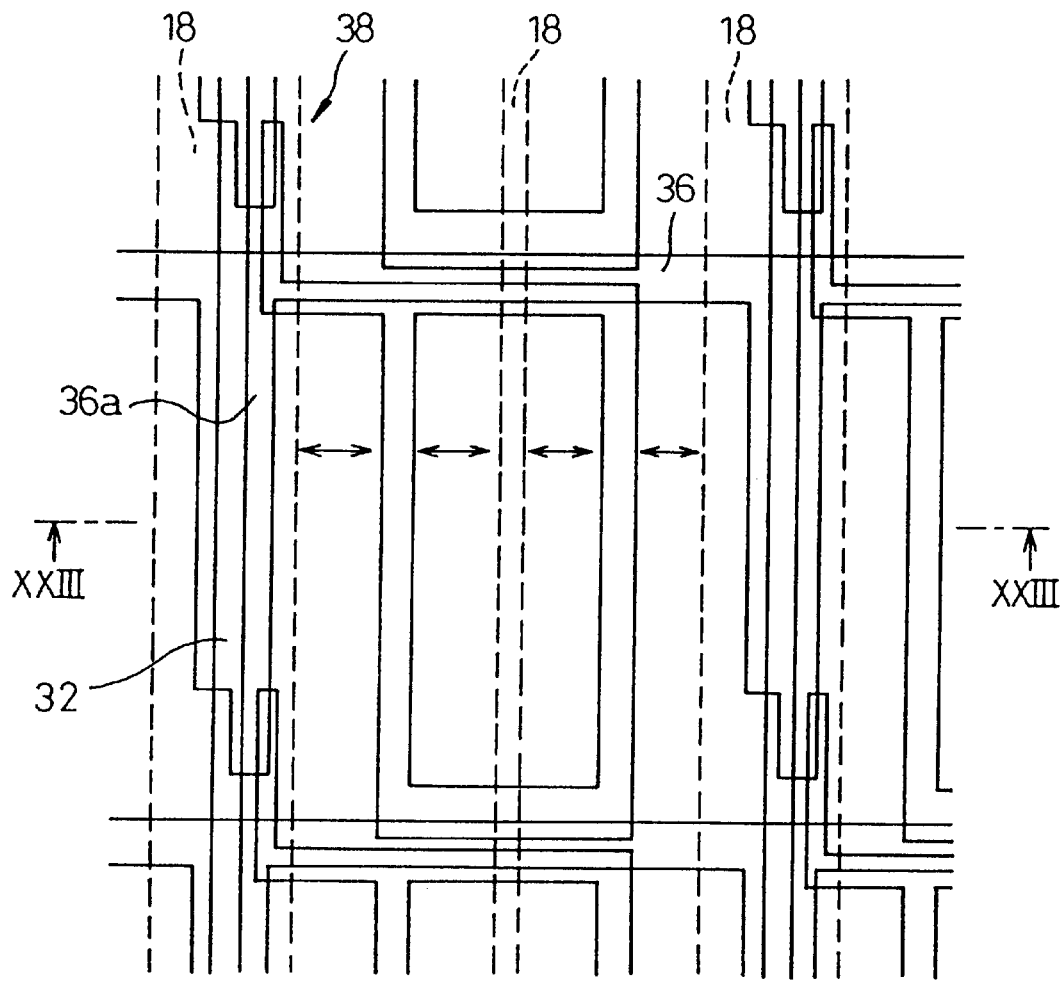
FIG. 22 is a view showing an embodiment including TFTs having a configuration of top gate type.
Figure 23:
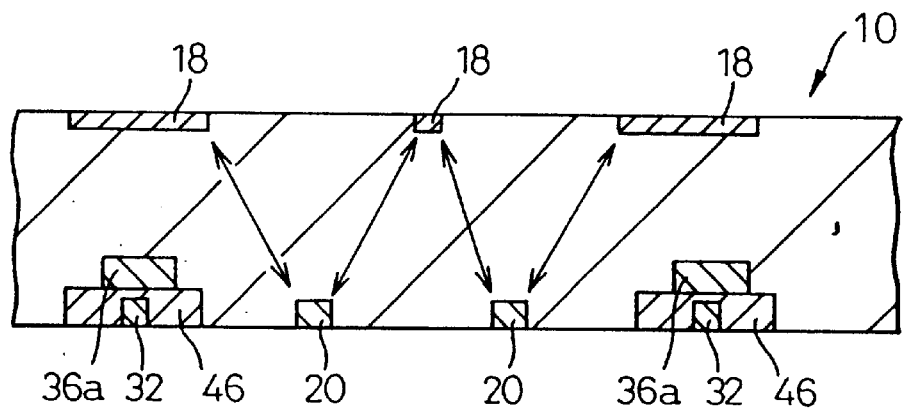
FIG. 23 is a cross-sectional view taken in line XXIII—XXIII in FIG. 22.

This process is shown in FIGS. 22 and 23. This embodiment is substantially similar to the embodiment of FIGS. 12 and 13 in which the gate line 36 (having the downward extension 36a) and the drain line 32 are replaced with each other vertically.

The distance between each first electrode 18 and each second electrode 20 is set to the range of 6 μm to 20 μm. This has made it possible to drive the liquid crystal simply by applying a voltage of not higher than 15 V. between the electrodes. It has been ascertained that the thicker the cell, the lower the drive voltage. The cell thickness is set to the range of 3 μm to 6 μm. A superior white brightness could be obtained when the panel is 0.5 μm ±0.2 μm in terms of Δnd. Further, this liquid crystal display apparatus includes a vertically aligned liquid crystal, and therefore a configuration with overlapped uniaxial optical films of negative refractive anisotropy is effective for improving the visual angle. For example, assume that the cell thickness is set to d for the liquid crystal panel, and the refractive anisotropy of the liquid crystal Δn. Also, assuming that the film thickness is d2 and the refractive anisotropy thereof Δn2. The system is configured to assure the relation in which Δn×d is substantially equal to Δn2×d2.

Figure 18:
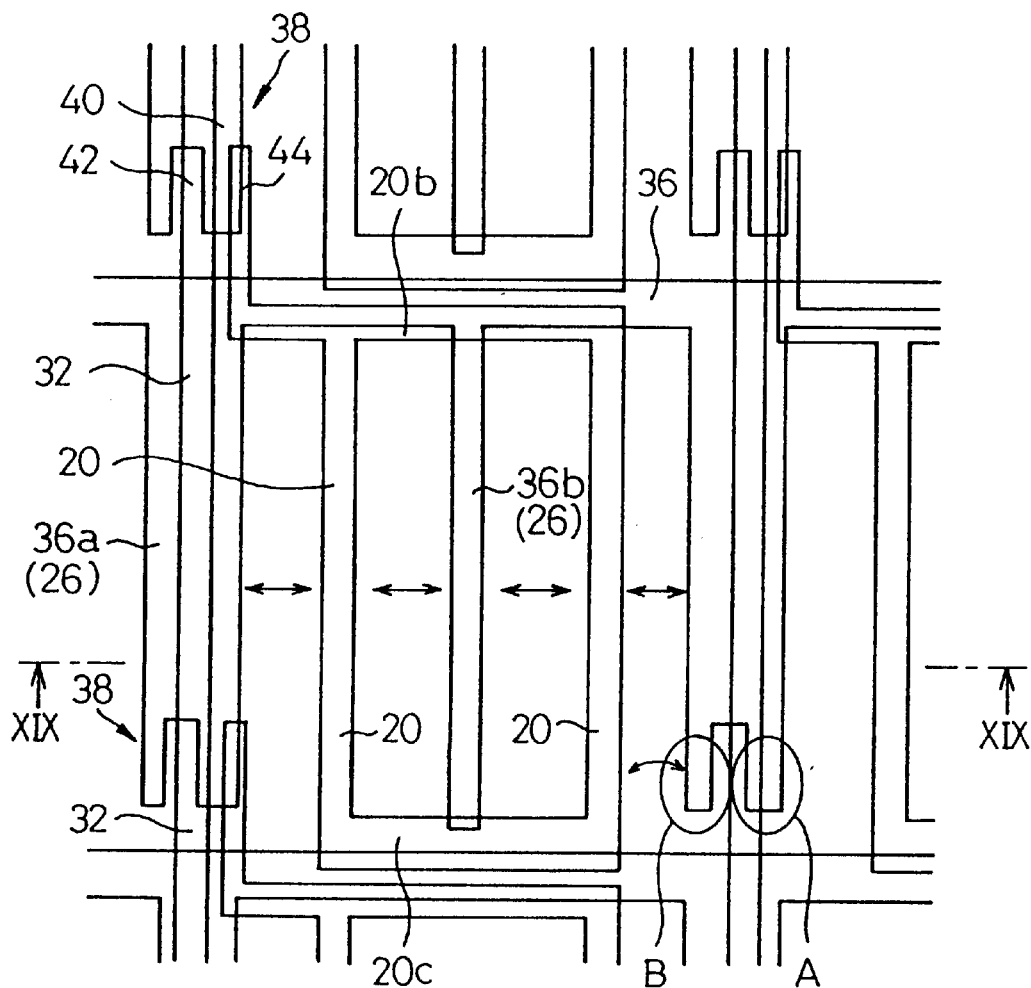
FIG. 18 is a view showing an embodiment in which the gate electrodes of the TFT substrate are used as display electrodes.
Figure 19:
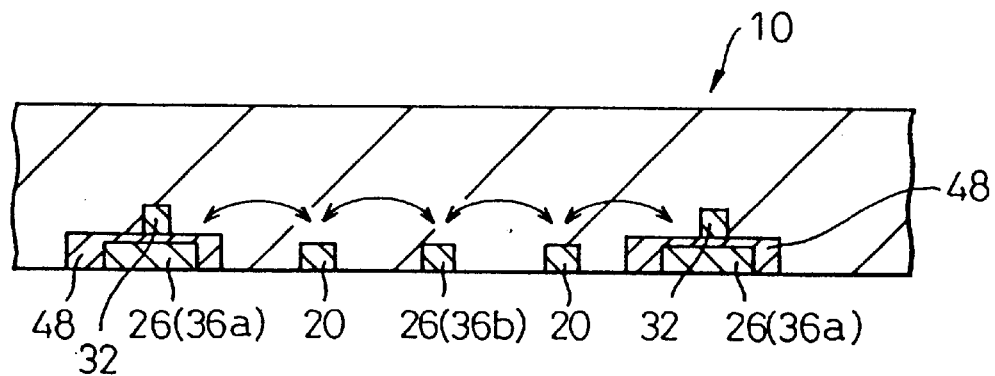
FIG. 19 is a cross-sectional view taken in line XIX—XIX in FIG. 18.

FIGS. 18 and 19 show an embodiment in which the gate electrode of the TFT substrate is used as a common electrode for display. In this case, a liquid crystal display apparatus high in aperture ratio driven by the horizontal electric field can be realized. The first electrode 18 of the first substrate 12 of the embodiment described above is not included, and the transverse electric field is formed by the second electrodes 20 and the third electrodes 26 of the second substrate 14. The second electrode 20 is connected to the source electrode 44 of the TFT 38, and the third electrode 26 is connected to the gate line 36. As in the embodiment of FIGS. 12 and 13, the gate line 36 includes the lower extension 36a extending along the data lines 32. The gate line 36 further includes a second lower extension 36b located at the central portion of the pixel. These lower extensions 36a and 36b constitute the third electrode 26.

As shown in FIGS. 18 and 19, in order to improve the aperture ratio for the drive using the transverse electric field, the overlap of the gate line 36 with the first portions 20b and 20c of the second electrode 20 can be used as a subsidiary capacitor. In this case, the third electrode 26 connected to the gate line 36 drives the liquid crystal by forming an electric field between itself and the second electrode 20 as a common potential during the nonselected period. As a result, the LCD of tranverse electric field type can be formed with an improved aperture ratio. Also, as the shape of the forward end of the downward extension 36a on the data line, apart from the bend (the portion designated by A in the drawing) for forming a TFT 38, the forward end of the downward extension 36a is extended (the portion designated by B in the drawing) separately for applying a uniform electric field to the liquid crystal.

Figure 20:
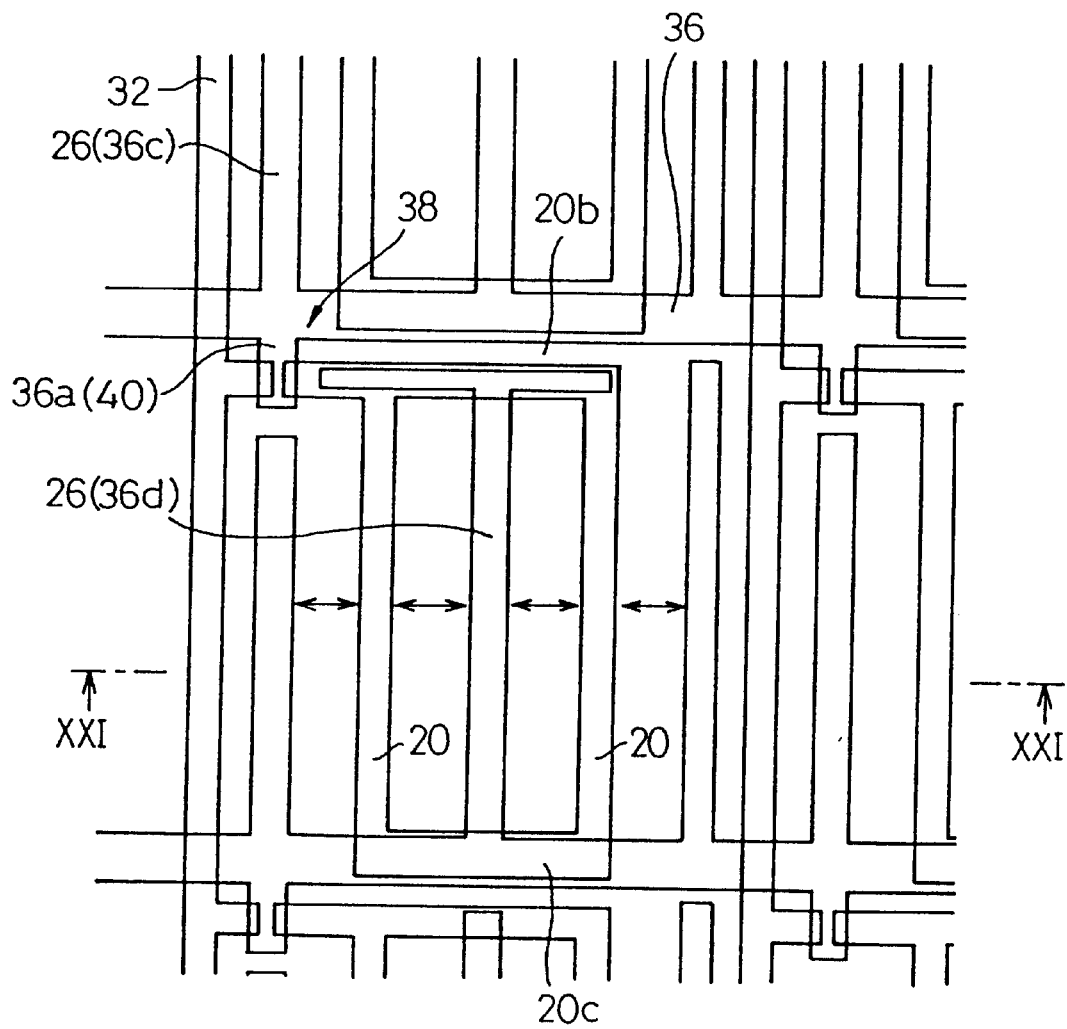
FIG. 20 is a view showing a modification of the embodiment of FIG. 18.
Figure 21:
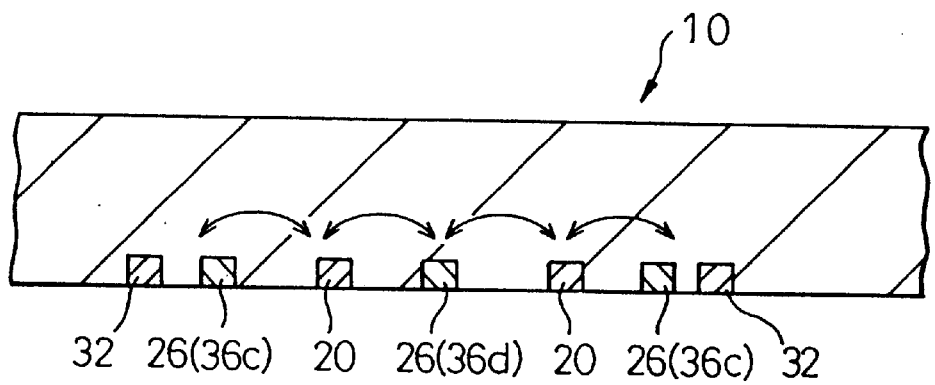
FIG. 21 is a cross-sectional view taken in line XXI—XXI in FIG. 20.

FIGS. 20 and 21 show a modification of the embodiment of FIGS. 18 and 19. In this example, the gate line 36 includes the lower extension 36a (the gate electrode 40) and the upper extension 36c extending along the data line 32. The TFT 38 is formed on the lower extension 36a, and the upper extension 36c constitutes the third electrode 26. Further, the gate line 36 has the central extension 36d extending to the center of the pixel, and this central extension 36d also constitutes the third electrode 26. In this case, the upper extension 36c is extended on the side of the data line 32 in parallel to the data line 32. The upper and lower portions of the central extension 36d are overlapped with the first portion 20b and the second portion 20c, respectively, of the second electrode 20 thereby to form a subsidiary capacitor.

The first electrode 18 of the first substrate 12, though lacking in the embodiments of FIGS. 18 to 21, can of course be formed at the position of the first substrate 12 corresponding to the third electrode 20.

Figure 24:
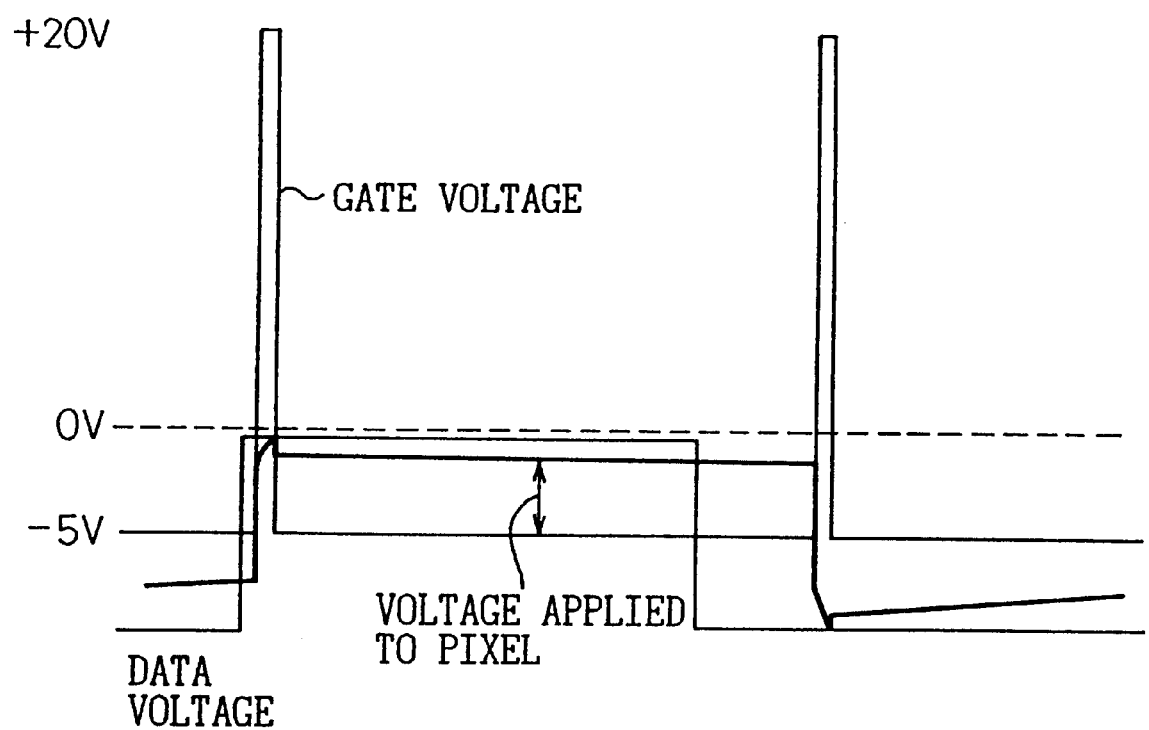
FIG. 24 is a diagram showing an example of the drive waveform obtained when the gate electrodes are used as a common electrode.

FIG. 24 shows an example of a drive waveform in the case where the extensions 36c and 36d of the gate line 36 are used as a common electrode. For driving the TFT, it is necessary to apply an off voltage of about −5 V to the gate. This voltage is used for a common electrode, and therefore the data voltage is also required to change about the voltage of −5 V. This configuration is realized by applying −10 V as a reference drive voltage for the driver. The data itself is applied as a logic level up to 3 V, for example, and therefore the adjustment is required.

Figure 25:
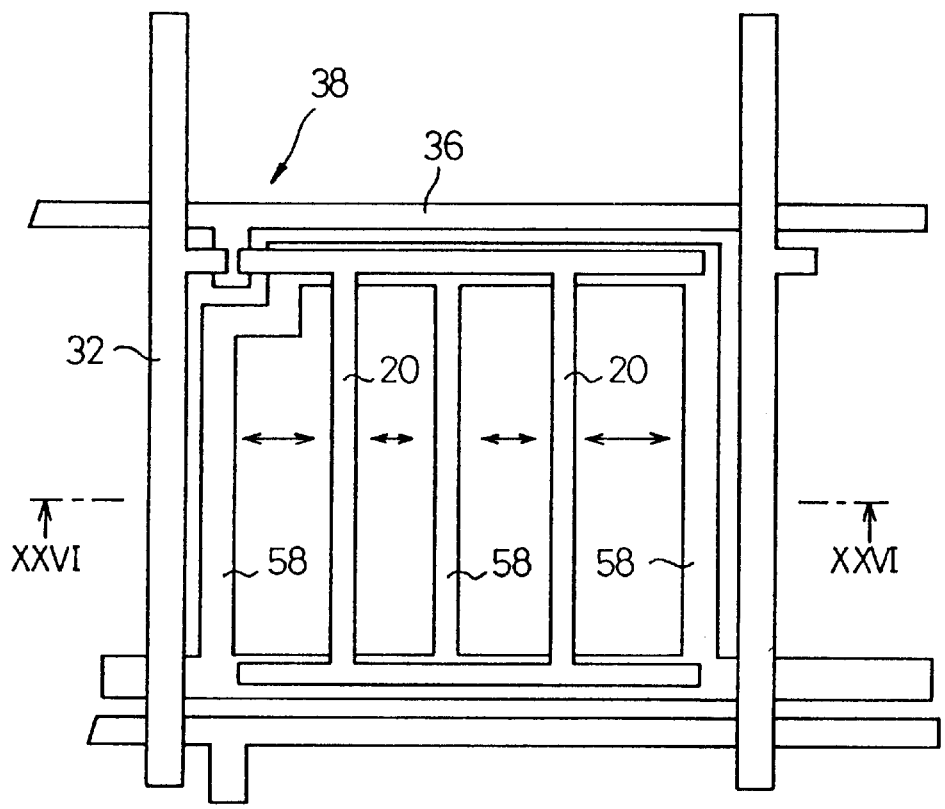
FIG. 25 is a view showing another embodiment in which an oblique electric field is applied.
Figure 26:
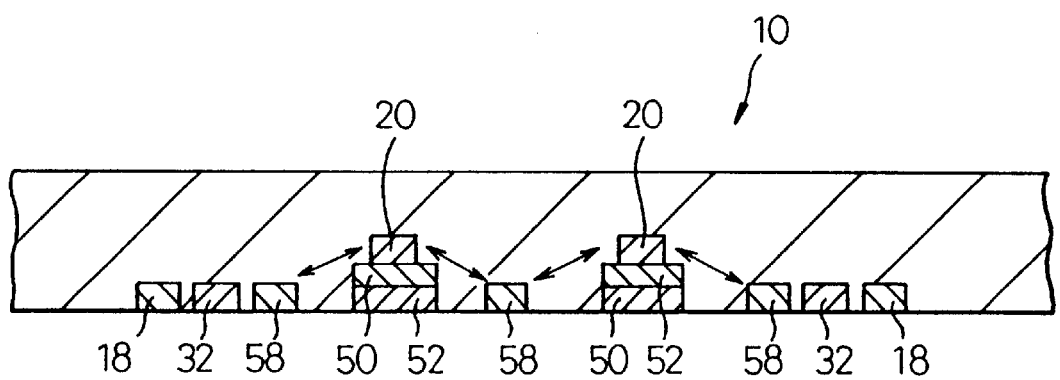
FIG. 26 is a cross-sectional view taken in line XXVI—XXVI in FIG. 25.

FIGS. 25 and 26 show another embodiment for applying an oblique electric field. In this example, the oblique electric field is formed between the first electrode 58 and the second electrode 20. The first electrode 58 has a function, for example, similar to the first electrode of FIG. 1. However, the first electrode 58 and the second electrode 20 are both located on the second substrate 14.

The first electrode 58 is arranged in contact with the substrate surface of the second substrate 14. The second electrode 20 is arranged at a distance from the substrate surface of the second substrate 14. Specifically, the second electrode 20 is formed on a silicon nitride layer 50 and an amorphous silicon layer 52. In other words, when forming the TFT 38, the source electrode layer is formed on the silicon nitride layer 50 and the amorphous silicon layer 52. Also, the second electrode 20 is formed on the silicon nitride layer 50 and the amorphous silicon layer 52 together with the source electrode layer.

Therefore, the first electrode 58 and the second electrode 20 which have different heights can form an oblique electric field. By utilizing this oblique electric field, an alignment free of disclination can be realized.

In this process, a display with an especially small disclination could be realized when the displacement between the first and second electrode layers forming the oblique electric field is not less than 0.3 $\mu$m or preferably not less than 0.6 $\mu$m. In other words, a superior display could be realized by setting the thickness of the silicon nitride layer 50 and the amorphous silicon layer 52 to not less than 0.3 $\mu$m.

To provide a difference in height between the first electrode 58 and the second electrode 20, it is also necessary to form a special layer in addition to the silicon nitride layer 50 and the amorphous silicon layer 52. For example, an ultraviolet setting resin is coated, and an electrode is formed thereon and connected to the source electrode, so that the source electrode can be separately farther from the glass substrates. In this case, the electric field between the second electrode 20 and the first electrode 58 in the gate line layer assumes a more oblique shape.

The foregoing description refers to the case of an inverse stagger. A similar configuration can be realized, however, with a stagger type. In this case, the gate constituting a common electrode layer is most distant from the substrates. In FIGS. 25 and 26, the second electrode becomes the first electrode constituting a common electrode, and the second electrode constitutes a pixel electrode. Also, the relative positions of SiN and a-Si are reversed or SiN is further overlapped on the double layers of SiN, a-Si. In this case, the presence of double SiN layers may further increase the difference in height between the electrodes.

Figure 27:
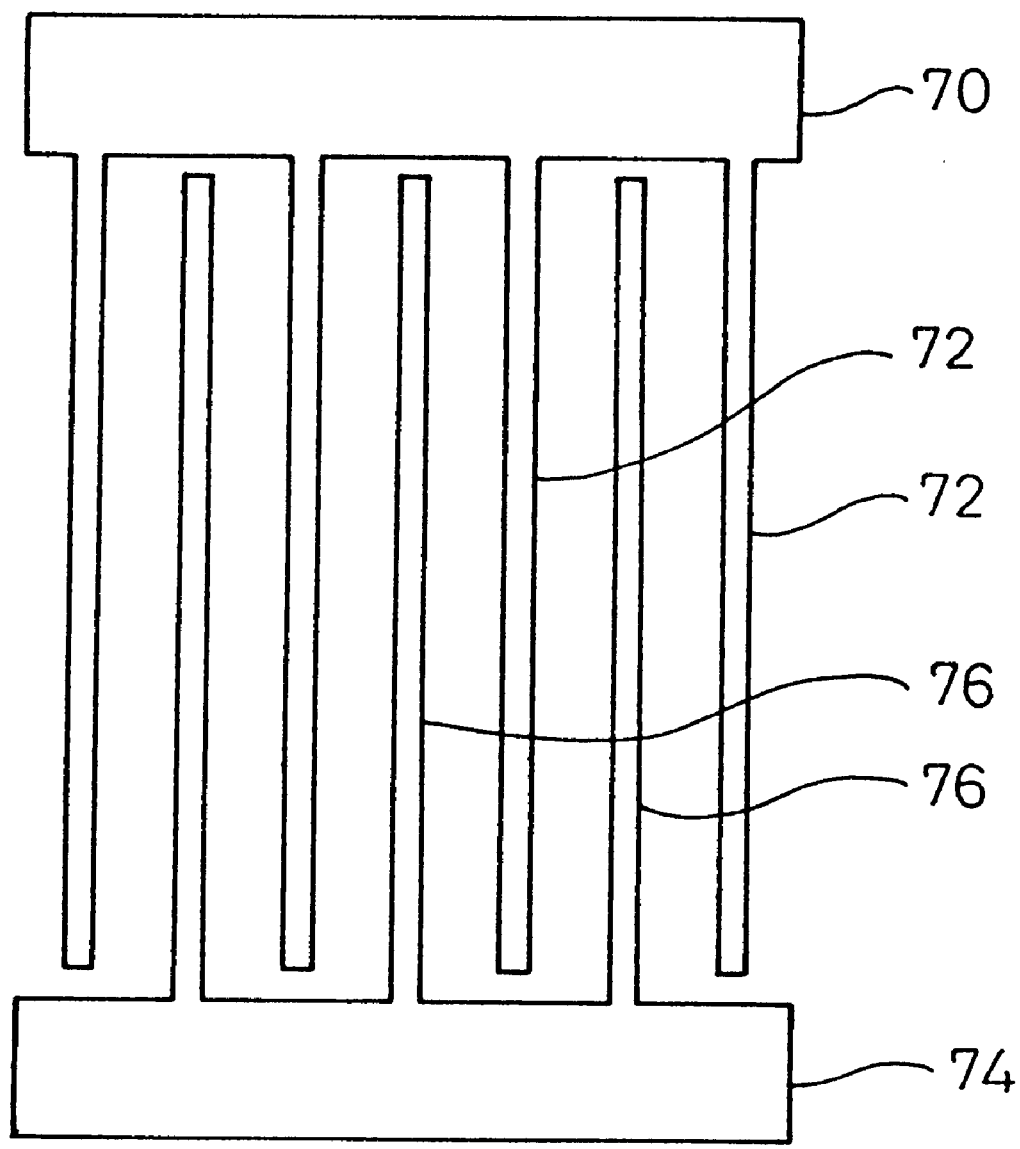
FIG. 27 is a view showing an example for explaining still another embodiment of the invention in which each electrode includes a plurality of parallel electrode elements in a unit pixel.

FIG. 27 shows an example for explaining a liquid crystal display apparatus according to still another embodiment of the invention, in which each electrode includes a plurality of parallel electrode elements in each pixel. FIG. 27 is a view of the electrode configuration in a single pixel as taken from above one of the substrates of the liquid crystal display apparatus. The first electrode 70 is formed in the shape of a comb, and has a plurality of parallel electrode elements 72. The electrode elements 72 of the first electrode 70 and the electrode elements 76 of the second electrode 74 are formed alternately in parallel to each other.

Figure 28:
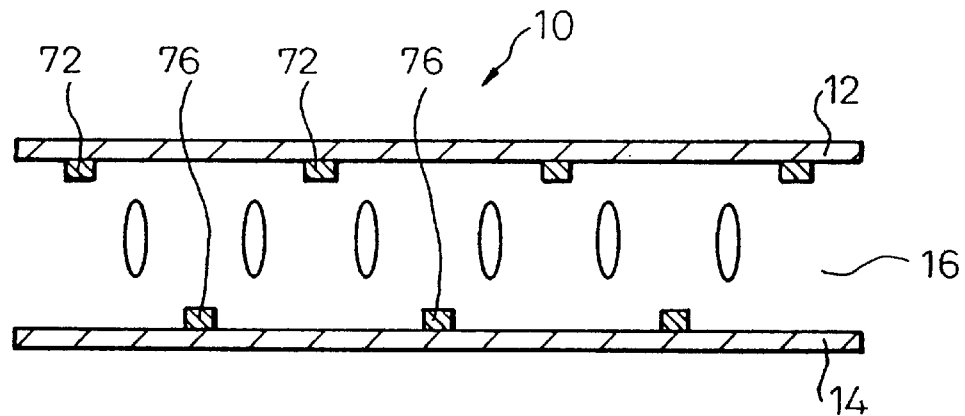
FIG. 28 is a view showing the state of a liquid crystal display apparatus of oblique electric field type with no voltage applied thereto.
Figure 29:
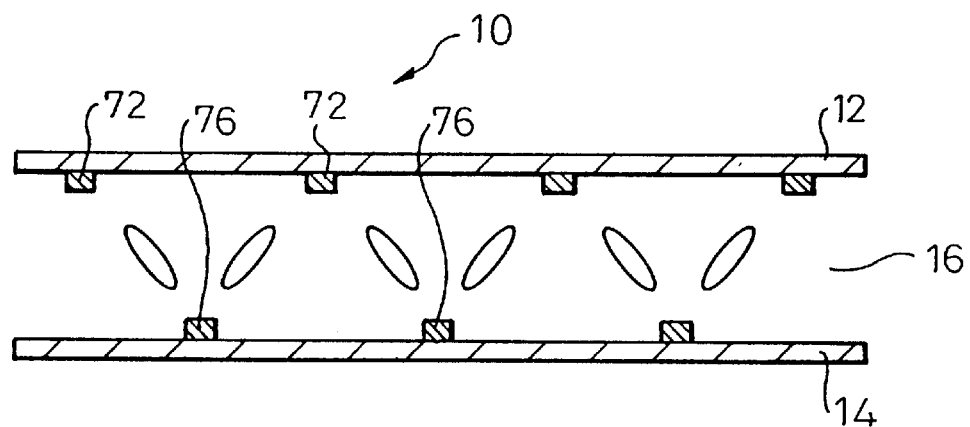
FIG. 29 is a view showing the liquid crystal display apparatus of FIG. 28 with a voltage applied thereto.

FIG. 28 shows the state of a liquid crystal display apparatus of oblique electric field type with no voltage applied thereto, and FIG. 29 shows the state of the liquid crystal display apparatus of FIG. 28 with a voltage applied thereto. In FIGS. 28 and 29, the liquid crystal display apparatus 10 comprises the first and second substrates 12 and 14 and the liquid crystal layer 16. Further, the first substrate 12,includes the first electrode elements 72, and the second substrate 14 includes the second electrode elements 76. The first electrode elements 72 and the second electrode elements 76, as shown in FIG. 27, are arranged staggered from each other in the direction parallel to the substrate surfaces.

The first electrode 70 having the first electrode elements 72, like the common electrode 18 shown in FIGS. 6 to 26, can be formed on the first substrate (color filter substrate) 12. The second electrode 74 having the second electrode elements 76 can be connected to the TFTs 38 of the active matrix in the same manner as the pixel electrodes 20 shown in FIGS. 6 to 26.

The liquid crystal layer 16 includes a liquid crystal having a positive dielectric anisotropy, and a vertical alignment layer (not shown) is formed on the first and second substrates 12, 14. As a result, when no voltage is applied, the liquid crystal molecules are aligned vertically (FIG. 28), while when a voltage is applied, the liquid crystal molecules are aligned along the oblique electric field (FIG. 29). This operation is similar to the corresponding ones in the aforementioned embodiments.

Figure 30:
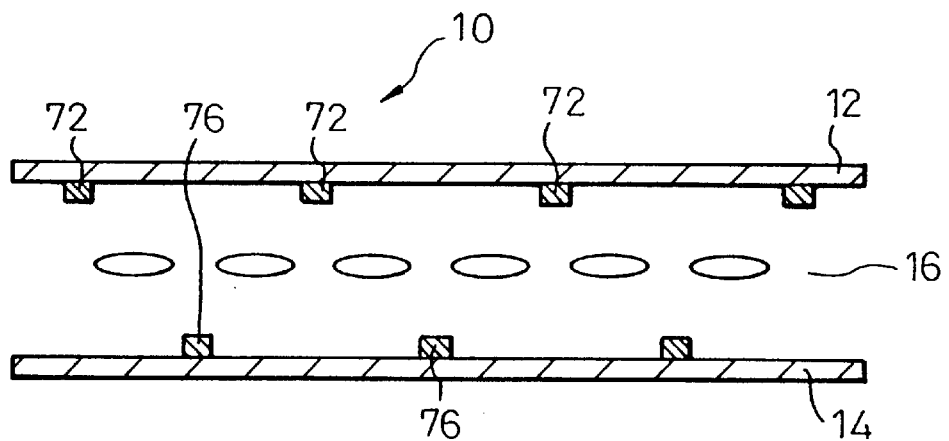
FIG. 30 is a view showing the state of another liquid crystal display apparatus of oblique electric field type with no voltage applied thereto.

FIG. 30 shows the state of another liquid crystal display apparatus of oblique electric field type when no voltage is applied thereto. In this case too, the first substrate 12 has first electrode elements 72, and the second substrate 14 has second electrode elements 76. The first electrode elements 72 and the second electrode elements 76, as shown in FIG. 27, are arranged staggered in parallel to each other in the direction parallel to the substrate surfaces. In FIG. 30, the liquid crystal layer 16 includes a liquid crystal having a positive dielectric anisotropy, and the first and second substrates 12 and 14 are formed with a horizontal alignment layer (not shown). Thus, when no voltage is applied, the liquid crystal molecules are aligned substantially parallel to the substrate surfaces. When no voltage is applied, the liquid crystal molecules are aligned along the oblique electric field. The embodiments described below are applicable to both the liquid crystal display apparatus of vertical alignment type shown in FIG. 28 and the liquid crystal display apparatus of horizontal alignment type shown in FIG. 30.

In the electrode structure as shown in FIG. 27, it is assumed that the first substrate 12 and the second substrate 14 are misaligned from each other when attached to each other. The gap between the first electrode elements 72 of the first substrate 12 and the electrode elements 76 of the second substrate 14 (interelectrode gap) undergoes a change, so that the voltage-transmittance characteristic curve changes at the time of using the liquid crystal display apparatus.

Figure 31:
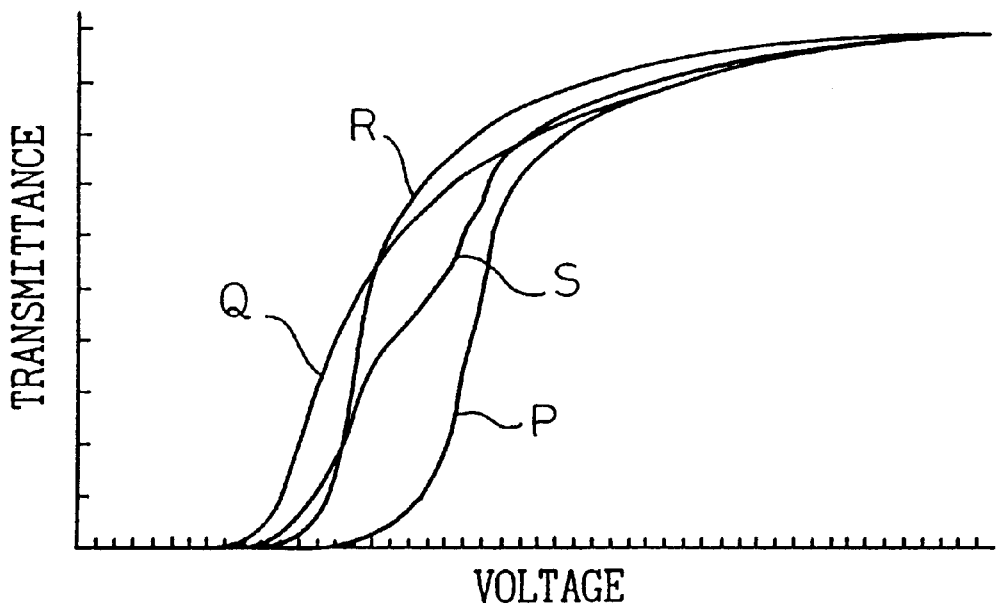
FIG. 31 is a view showing an example of the voltage-transmittance characteristic of a liquid crystal display apparatus of oblique electric field type with the liquid crystal aligned in the direction perpendicular to the substrates when no voltage is applied thereto.

FIG. 31 shows an example of the voltage-transmittance characteristic curve for the liquid crystal display apparatus of electric field type in which the molecules are aligned in the direction perpendicular to the substrates when no voltage is applied thereto. The curve P represents the voltage-transmittance characteristic for the interelectrode gap of 15 µm, the curve Q for the interelectrode gap of 10 µm, and the curve R for the interelectrode gap of 6 µm. As seen from FIG. 31, the voltage-transmittance characteristic curve is affected to a considerable measure by the interelectrode gap. In assembling the liquid crystal display apparatus, therefore, great care must be taken not to cause any misalignment when the first substrate 12 and the second substrate 14 are attached to each other. Only a very small manufacturing margin is allowed.

The curve S shows the voltage-transmittance characteristic with the three curves averaged out. The curve S represents the case in which a plurality of interelectrode gaps coexist in a pixel. In this case, as shown by the curve S, the voltage-transmittance characteristic curve becomes less steep and the transmittance changes less with the voltage.

Also, in the case where a misalignment occurs between the first and second substrates 12, 14 attached to each other, the voltage-transmittance characteristic shifts to the low voltage side in some areas, and to the high voltage side in other areas. Thus, the change of the unit pixel as a whole is decreased as compared with when the interelectrode gaps are uniform. For the reason mentioned above, the change in the voltage-transmittance characteristic due to the misalignment or the variations of the electrode width at the time of manufacture can be suppressed.

Figure 32:
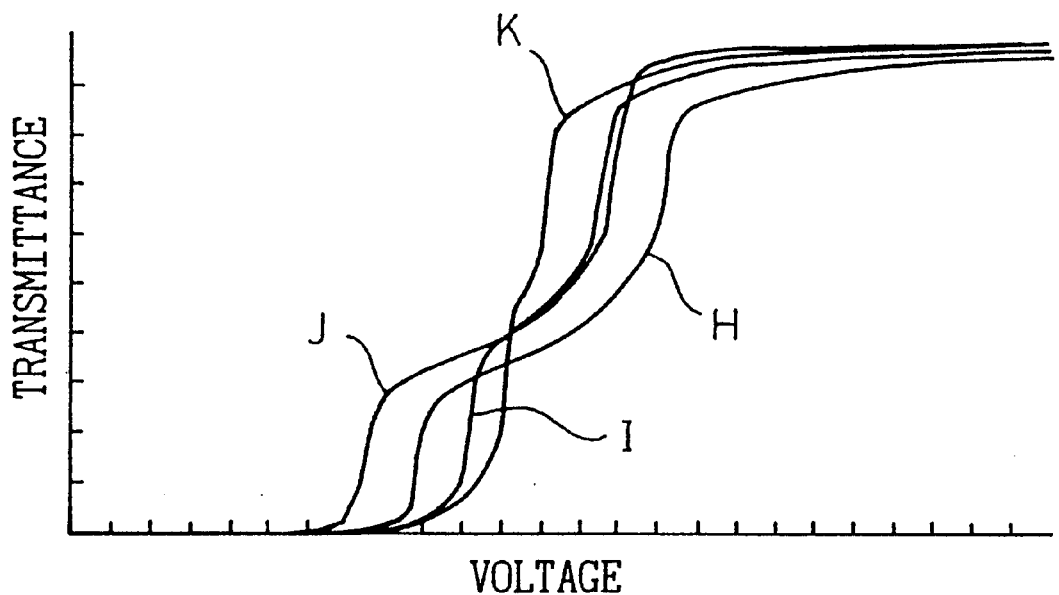
FIG. 32 is a view showing the voltage-transmittance characteristic of a liquid crystal display apparatus of oblique electric field type having a misalignment between the first and second substrates attached to each other.

FIG. 32 shows the voltage-transmittance characteristic curve for the liquid crystal display apparatus of oblique electric field type with the first and second substrates misaligned from each other. The curve H represents the voltage-transmittance characteristic for a misalignment of 3.9 µm, the curve I for a misalignment of 1.8 µm, the curve J for a misalignment of 5.8 µm, and the curve J for a misalignment of 0.4 µm. The misalignment causes two different interelectrode gaps and hence two steps in the voltage-transmittance characteristic curve. In addition, different degrees of misalignment for different liquid crystal panels differentiates the voltage-transmittance characteristic from one liquid crystal panel to another.

Consequently, the first electrode 70 and the second electrode 74 each include a plurality of parallel electrode elements 74 and 76 in a unit pixel. By setting at least one of the electrode width and the interelectrode gap of the electrode elements 74, 76 of the first and second electrodes to a non-uniform value, the change in the voltage-transmittance characteristic by a misalignment which may occur can be minimized. FIGS. 33 to 44 are diagrams showing cases in which at least one of the electrode width and the interelectrode gap is not uniform. In all cases, the cell thickness is 4 µm and the liquid crystal material has Δε of 14.8.

Figure 33:
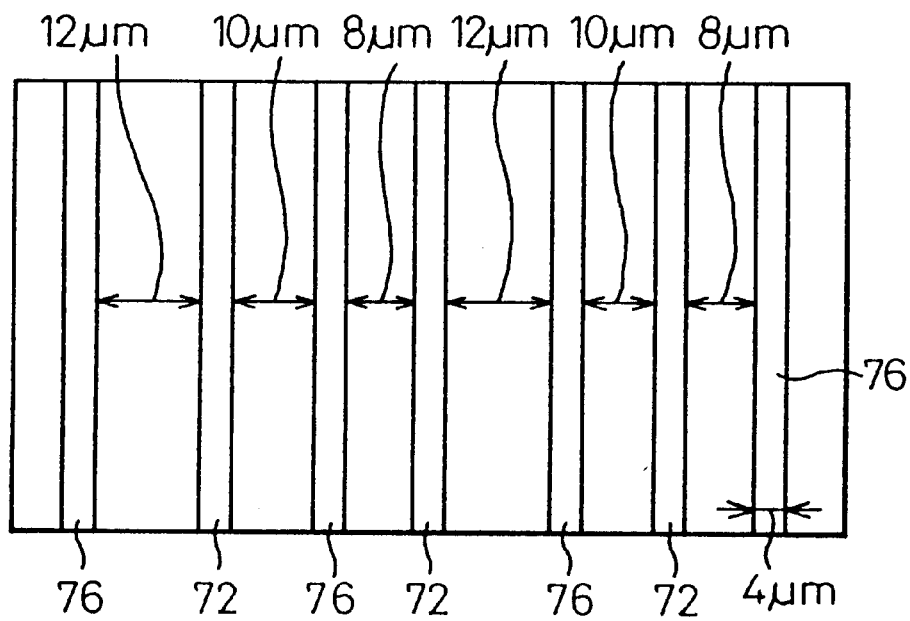
FIG. 33 is a view showing an example of the electrode elements with the interelectrode gap changed while keeping the electrode width constant.
Figure 34:
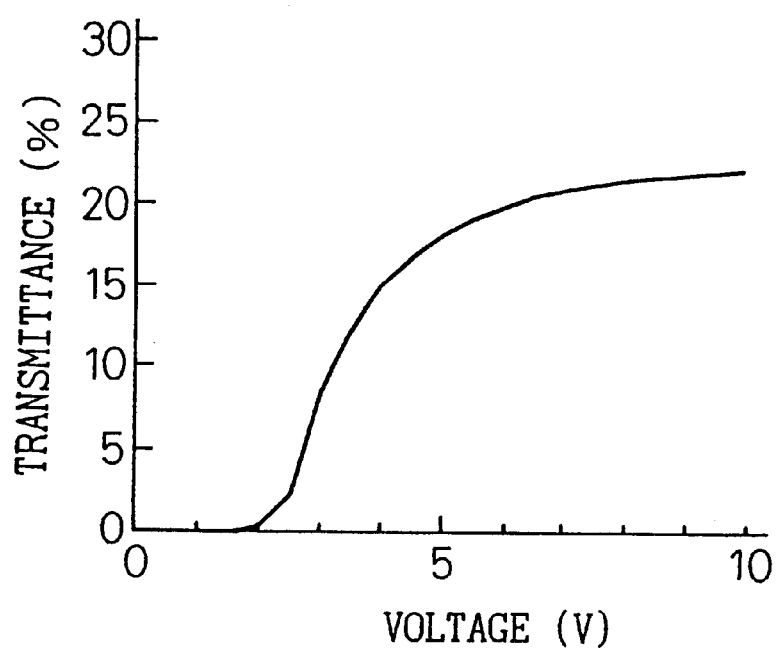
FIG. 34 is a view showing the voltage-transmittance characteristics in the case of using the electrode elements of FIG. 33.

FIG. 33 shows an example of the electrode elements 74 and 76 with the interelectrode gap changed while maintaining the electrode width constant. The electrode width of the parallel and linear electrode elements 74 and 76 is a constant 4 µm. In this example, the interelectrode gaps (the portions where the light is transmitted) between the electrode elements 74 and 76 forming an oblique electric field were 12 µ, 10, µm, 8 µm, 12 µm, 10 µm, 8 µm. FIG. 34 shows an associated voltage-transmittance characteristic curve. A plurality of different interelectrode gaps coexist, and different voltage-transmittance characteristics develop in corresponding interelectrode gaps in a unit pixel. The voltage-transmittance characteristic curve is the sum of them.

Figure 35:
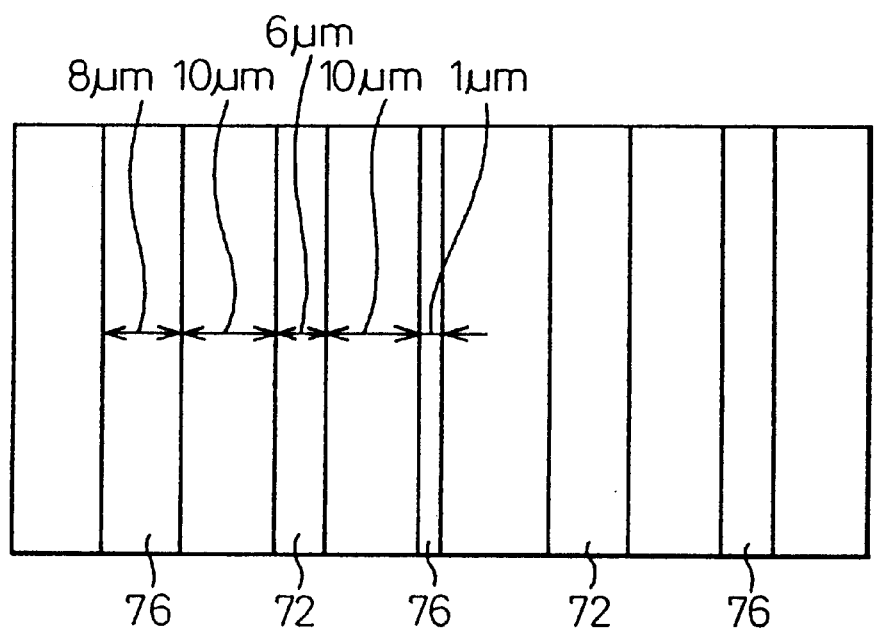
FIG. 35 is a view showing an example of the electrode elements with the electrode width changed while keeping the interelectrode gap constant.
Figure 36:
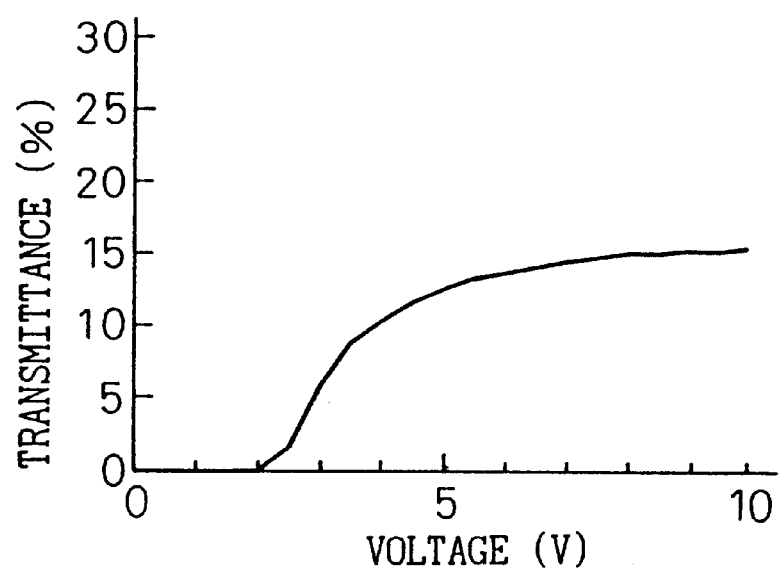
FIG. 36 is a view showing the voltage-transmittance characteristic in the case of using the electrode elements of FIG. 35.

In FIG. 35, different electrode widths 8 µm, 6 µm. 4 µm are used while keeping the same interelectrode gap (10 µm). The electrode elements 72 and 76 are arranged linearly in parallel, with a plurality of different electrode widths. As a result, a voltage-transmittance characteristic corresponding to each electrode width is exhibited in each unit pixel, and the voltage-transmittance characteristic curve for the whole pixel is the sum of them. FIG. 36 shows an associated voltage-transmittance characteristic curve.

Figure 37:
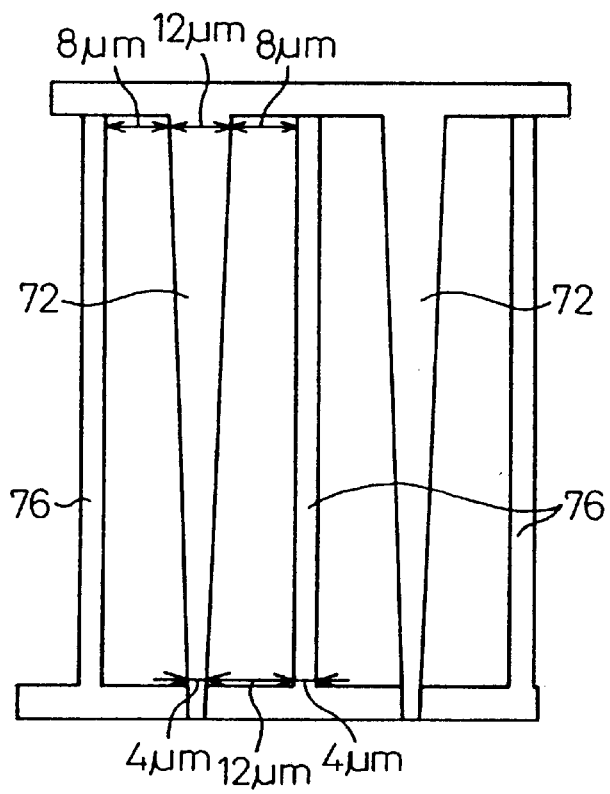
FIG. 37 is a view showing an example in which the electrode elements on the color filter are kept constant and the electrode elements on the TFT are trapezoidal thereby to change the interelectrode gap.
Figure 38:
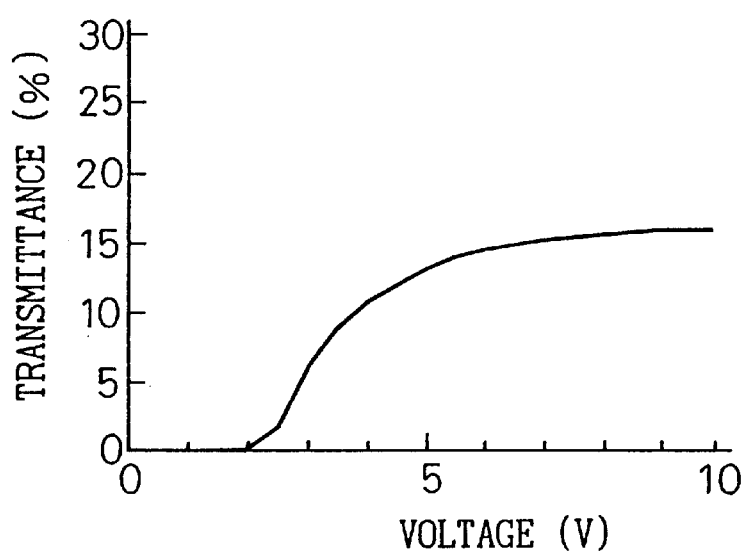
FIG. 38 is a view showing the voltage-transmittance characteristic in the case of using the electrode elements of FIG. 37.

In FIG. 37, the electrode elements 76 on the TFT substrate are arranged at a predetermined width and pitch, while the electrode elements 72 on the color filter substrate are trapezoidal for changing the interelectrode gap. The electrode width of the trapezoidal electrode elements 72 is 12 µm for a wide portion and 4 µm for a narrow portion. The interelectrode gap is 8 µm for a wide electrode portion, and 12 µm for a narrow electrode portion. The interelectrode gap continuously changes longitudinally of the electrode elements 72. FIG. 38 shows the voltage-transmittance characteristic curve involved.

Figure 39:
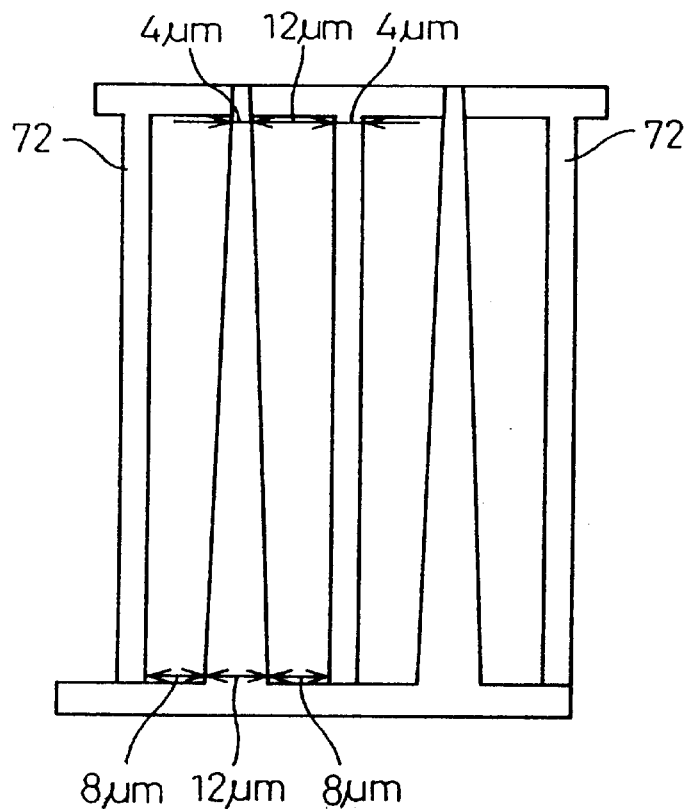
FIG. 39 is a view showing an example in which the electrode elements on the color filter are trapezoidal and the electrode elements on the TFT are kept constant thereby to change the interelectrode gap.
Figure 40:
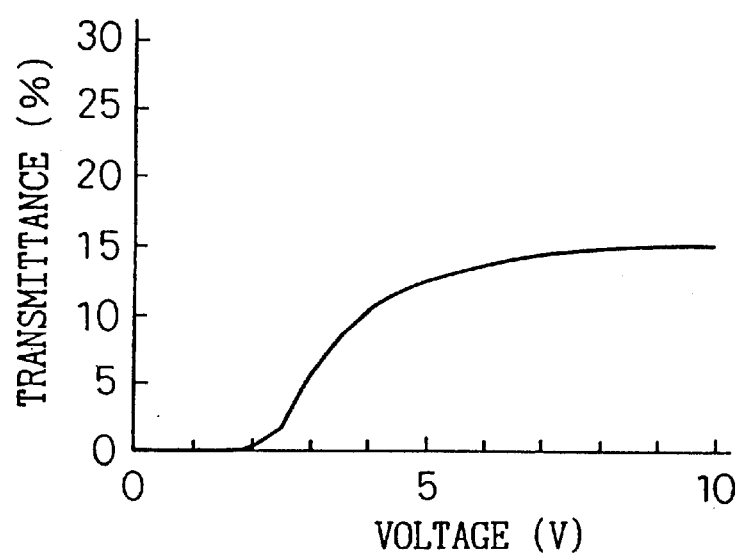
FIG. 40 is a view showing the voltage-transmittance characteristic in the case of using the electrode elements of FIG. 39.

In FIG. 39, the electrode elements 72 on the color filter substrate are arranged at a fixed width and pitch, while the electrode elements 76 on the TFT substrate are trapezoidal with the interelectrode gaps changed. The dimensional relations are the reverse of those for the case shown in FIG. 37. FIG. 40 shows the voltage-transmittance characteristic curve involved.

In FIGS. 37 and 39, the electrode elements are formed into a trapezoidal shape and innumerable different interelectrode gaps lead to innumerable different corresponding voltage-transmittance characteristic curves. The voltage-transmittance characteristic for the whole pixel, therefore, is the sum of them.

Figure 41:
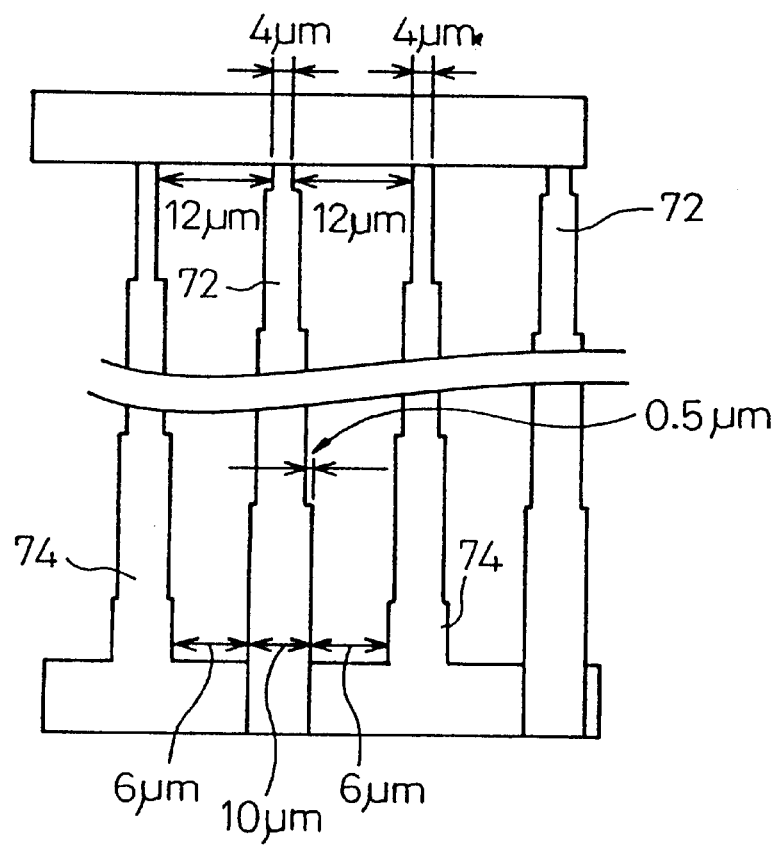
FIG. 41 is a view showing an example of the electrode elements stepped thereby to change the interelectrode gap.
Figure 42:
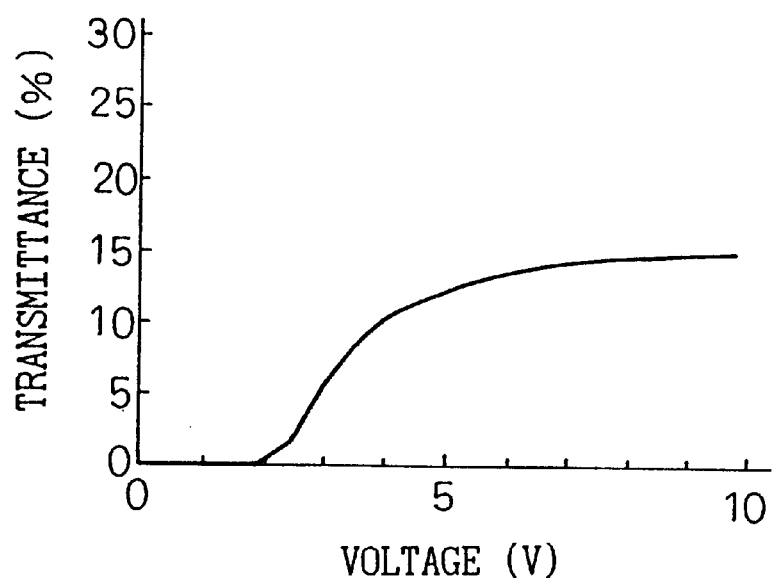
FIG. 42 is a view showing the voltage-transmittance characteristic in the case of using the electrode elements of FIG. 41.

In FIG. 41, the electrode elements 72, 76 are stepped for changing the interelectrode gap. In the process, in order to finely change the interelectrode gap, the steps are staggered between the electrode elements 76 on the TFT substrate and the electrode elements 72 on the color filter substrate. As compared with the interelectrode gap in FIGS. 37 and 39 which continuously changes, the interelectrode gap in FIG. 41 discretely changes at the same rate as the interelectrode gaps in FIGS. 37 and 39. In order to change the interelectrode gap as finely as possible, the steps of the electrode elements are staggered between the first and second substrates. FIG. 42 shows the voltage-transmittance characteristic curve involved.

Figure 43:
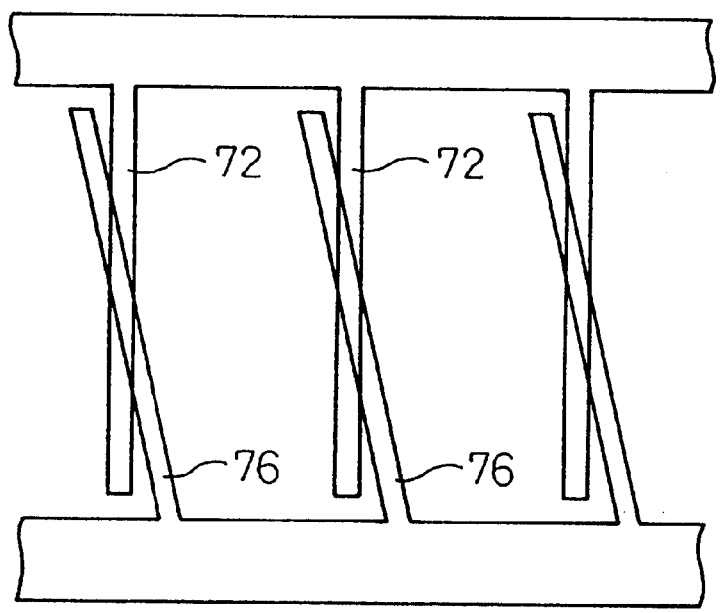
FIG. 43 is a view showing an example of changing the interelectrode gap by causing the electrode elements on the TFT to cross the electrode elements on the color filter.
Figure 44:
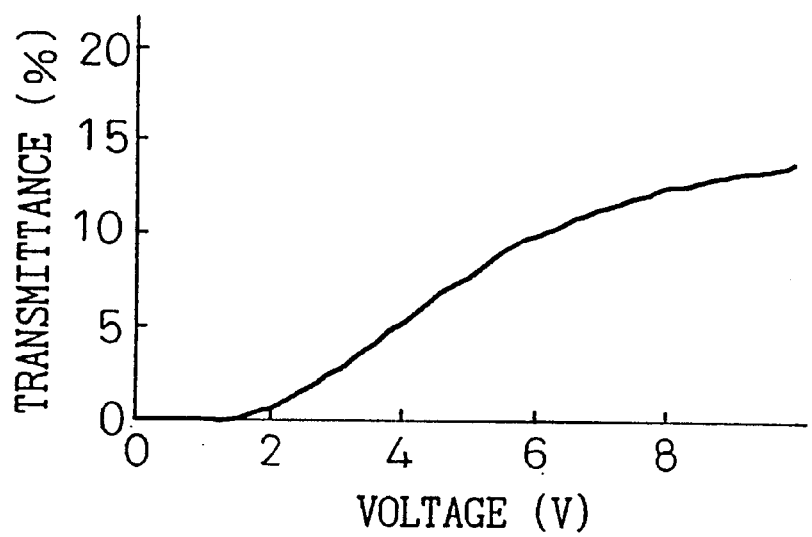
FIG. 44 is a view showing the voltage-transmittance characteristic in the case of using the electrode elements of FIG. 43.

In FIG. 43, the interelectrode gap is changed by causing the electrode elements 76 on the TFT substrate to cross the electrode elements 72 on the color filter substrate. The electrode elements 72 on the color filter substrate are parallel to a bus line (the bus line 32 of FIG. 6, for example), while the electrode elements 76 on the TFT substrate are formed at an angle of 30 degrees to the same bus line. The electrode elements 76 on the TFT substrate are arranged at pitches of 16 µm. In this way, innumerable different interelectrode gaps are formed. FIG. 44 shows the voltage-transmittance characteristic involved. Alternatively, the electrode elements 76 on the TFT substrate can be formed in parallel to the bus line, and the electrode elements 72 on the color filter substrate can be formed at an angle (30 degrees, for example) to the bus line.

In all cases of FIGS. 33 to 43, the differences in the interelectrode gap due to the misalignment between the first and second substrates 12 and 14 can be offset to some extent in a unit pixel. Also, in the case where the interelectrode gap is changed within a pixel as shown in FIGS. 33 to 43, a plurality of voltage-transmittance characteristics develop in each pixel, so that the voltage-transmittance characteristic for the whole pixel is the sum of a plurality of the individual voltage-transmittance characteristics. As a result, the behavior of the transmittance with respect to the voltage becomes gentle, so that the voltage-transmittance characteristic changes less with the interelectrode gap.

In the conventional liquid crystal display apparatus of oblique electric field type, as explained above with reference to FIG. 32, a misalignment between the first and second substrates attached to each other develops two different interelectrode gaps. As a result, the voltage-transmittance characteristic curve is formed in two steps and the difference in the degree of misalignment from one liquid crystal panel to another leads to different voltage-transmittance characteristics for different liquid crystal panels. In the liquid crystal display apparatus Model 15 XGA of an oblique electric field type having stepped electrode elements 72, 76 as shown in FIG. 41, a misalignment between the first and second substrates attached to each other leads to no change in the voltage-transmittance characteristic, and no difference develops in the voltage-transmittance characteristic for different liquid crystal panels.

As explained above, according to this invention, a bright liquid crystal display apparatus with a high aperture ratio and a superior visual angle characteristic can be realized. Also, a liquid crystal display apparatus with a small change in the voltage-transmittance characteristic is obtained.

What is claimed is:

1. A liquid crystal display apparatus comprising:
    first and second opposed substrates, a liquid crystal layer sealed between said first and second substrates, first and second electrodes formed on said first substrate at positions shifted from each other in the direction parallel to the substrate surfaces, said first substrate having gate lines, data lines and TFTs, and electrodes of one of said first and second electrodes including portions extending from one of the gate lines;
    wherein said portions extending from one of the gate lines each extend only in a single direction from said associated gate line towards an adjacent gate line.

2. A liquid crystal display apparatus as described in claim 9, characterized in that the electrodes constituting the portions extending from said gate lines are used as a common electrode, electrodes of the other of said first and second electrodes are connected to the source electrodes of the TFTs, and the liquid crystal is driven by the electric field formed between the first and second electrodes.

3. A liquid crystal display apparatus as described in claim 1, wherein the portions extending from one of the gate lines each have a generally uniform width along the length thereof.

4. A liquid crystal display apparatus comprising:
    first and second opposed substrates, a liquid crystal layer sealed between said first and second substrates, first and second electrodes formed on said first substrate at positions shifted from each other in the direction parallel to the substrate surfaces, said first substrate having gate lines, data lines and TFTs, and electrodes of one of said first and second electrodes including portions extending from one of the gate lines;
    characterized in that the electrodes constituting the portions extending from said gate lines are used as a common electrode, electrodes of the other of said first and second electrodes are connected to the source electrodes of the TFTs, and the liquid crystal is driven by the electric field formed between the first and second electrodes; and
    further characterized in that first and second gate lines are adjacent to each other, the electrodes constituting the portions connected to the first gate lines extend to the vicinity of the second gate lines above the data line, the TFTs are formed at the forward ends of the electrodes constituting the portions connected to said first gate lines, the electrodes connected to said source electrodes are mainly located on the side opposite to said first gate lines with respect to the second gate lines, and the electrodes connected to said source electrodes are connected to the TFTs formed at the forward end of the electrodes constituting the portions connected to said first gate lines over said second gate lines.

5. A liquid crystal display apparatus comprising:
    first and second opposed substrates, a liquid crystal layer sealed between said first and second substrates, first and second electrodes formed on said first substrate at positions shifted from each other in the direction parallel to the substrate surfaces, said first substrate having gate lines, data lines and TFTs, and electrodes of one of said first and second electrodes including portions extending from one of the gate lines;
    characterized in that the electrodes constituting the portions extending from said gate lines are used as a common electrode, electrodes of the other of said first and second electrodes are connected to the source electrodes of the TFTs, and the liquid crystal is driven by the electric field formed between the first and second electrodes; and
    further characterized in that first and second gate lines are adjacent to each other, the electrodes constituting the portions connected to the first gate lines extend to the vicinity of the second gate lines above the data line, the TFTs are formed at the forward ends of the electrodes constituting the portions connected to said first gate lines, and the forward ends of the electrodes constituting the portions connected to said first gate lines are formed in two forked parts as portions for forming TFTs and portions for forming an electric field.

6. A liquid crystal display apparatus comprising:
    first and second opposed substrates, a liquid crystal layer sealed between said first and second substrates, first electrodes formed on said first substrate, and second electrodes formed on said second substrate, each of said first and second electrodes including a plurality of parallel electrode elements in a single pixel, the electrode elements of said first electrodes and the electrode elements of said second electrodes being alternately arranged, so that when viewed from above the substrates, the electrode elements of said first electrodes have a first shape, the electrode elements of said second electrodes have a second shape that is different from said first shape, so that, a gap between one electrode element of the first electrodes and another electrode element of the second electrodes that is positioned adjacent to said one electrode element changes when considered along the lengths of said one and said another electrode elements.

7. A liquid crystal display apparatus as described in claim 6, further comprising data bus lines, and wherein the electrode elements of at least one of said first and second electrodes are parallel or perpendicular to one of the data bus lines.

8. A liquid crystal display apparatus as described in claim 6, further comprising data bus lines, and wherein at least a portion of the electrode elements of at least one of said first and second electrodes is not parallel to one of the data bus lines.

9. A liquid crystal display apparatus as described in claim 6, wherein the electrode elements of at least one of said first and second electrodes have widths that vary along at least a portion of the lengths thereof.

10. A liquid crystal display apparatus as described in claim 9, wherein the widths of the electrode elements of at least one of said first and second electrodes changes in a stepwise manner.

11. A liquid crystal display apparatus as described in claim 10, wherein widths of the electrode elements of both said first and second electrodes change in a stepwise manner so that the widths are narrowed in the same direction.

12. A liquid crystal display apparatus comprising:

first and second opposed substrates, a liquid crystal layer sealed between said first and second substrates, first electrodes formed on said first substrate, and second electrodes formed on said second substrate, each of said first and second electrodes including a plurality of parallel electrode elements in a single pixel, the electrodes elements of said first electrodes and the electrode elements of said second electrodes being alternately arranged, when viewed from above the substrates, a first gap between a first electrode element of one of said first and second electrodes and a second electrode element of the other of said first and second electrodes being different from a second gap between the second electrode element and a third electrode element of said one of said first and second electrodes.

* * * * *

UNITED STATES PATENT AND TRADEMARK OFFICE
CERTIFICATE OF CORRECTION

PATENT NO. : 6,542,212 B2 Page 1 of 1
DATED : April 1, 2003
INVENTOR(S) : Chowdhury, T.

It is certified that error appears in the above-identified patent and that said Letters Patent is hereby corrected as shown below:

<u>Title page,</u>
Item [56], References Cited, please add the following FOREIGN PATENT DOCUMENTS:

| Country | Document Number | Date |
|---|---|---|
| -- JP | 5196950 | 8/1993 |
| JP | 6301036 | 10/1994 |
| JP | 736058 | 2/1995 |
| JP | 7159807 | 6/1995 |
| JP | 7191336 | 7/1995 |
| JP | 7234414 | 9/1995 |
| JP | 1048671 | 2/1998 -- |

<u>Column 15,</u>
Line 44, delete "9" and insert -- 1 --

Signed and Sealed this

Second Day of December, 2003

JAMES E. ROGAN
*Director of the United States Patent and Trademark Office*